(12) United States Patent
Murphy et al.

(10) Patent No.: US 11,125,619 B2
(45) Date of Patent: Sep. 21, 2021

(54) HYPERSPECTRAL IMAGER METHOD AND APPARATUS

(71) Applicant: TECHNOLOGICAL RESOURCES PTY. LIMITED, Melbourne (AU)

(72) Inventors: Richard J. Murphy, Sydney (AU); Arman Melkumyan, Sydney (AU); Anna Chlingaryan, Sydney (AU); Dai Bang Nguyen, Sydney (AU); Stuart Wishart, Sydney (AU); Alex Lowe, Sydney (AU); Steven Scheding, Sydney (AU)

(73) Assignee: Technological Resourses Pty. Limited, Melbourne (AU)

( * ) Notice: Subject to any disclaimer, the term of this patent is extended or adjusted under 35 U.S.C. 154(b) by 223 days.

(21) Appl. No.: 15/543,442

(22) PCT Filed: Jan. 14, 2016

(86) PCT No.: PCT/AU2016/000004
§ 371 (c)(1),
(2) Date: Jul. 13, 2017

(87) PCT Pub. No.: WO2016/112430
PCT Pub. Date: Jul. 21, 2016

(65) Prior Publication Data
US 2018/0031422 A1 Feb. 1, 2018

(30) Foreign Application Priority Data

Jan. 14, 2015 (AU) .................... 2015900094
May 15, 2015 (AU) .................... 2015901769

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0202* (2013.01); *G01J 3/0208* (2013.01); *G01J 3/0237* (2013.01);
(Continued)

(58) Field of Classification Search
CPC ...... G01J 3/2823; G01J 3/0202; G01J 3/0208; G01J 3/0237
(Continued)

(56) References Cited

U.S. PATENT DOCUMENTS 5,929,985 A 7/1999 Sandison et al.
7,135,682 B1 11/2006 Lucey
(Continued)

OTHER PUBLICATIONS

International Search Report, dated Apr. 5, 2016, for PCT/AU2016/000004, 7 pages.
(Continued)

*Primary Examiner* — Amir Shahnami
(74) *Attorney, Agent, or Firm* — Seed IP Law Group LLP

(57) ABSTRACT

A compact hyperspectral imager adapted to operate in harsh environments and to conduct post acquisition signal processing to provide automated and improved hyperspectral processing results is disclosed. The processing includes luminance and brightness processing of captured hyperspectral images, hyperspectral image classification and inverse rendering to produce luminance invariance image processing.

25 Claims, 22 Drawing Sheets

(51) Int. Cl.
*G06K 9/62* (2006.01)
*H04N 5/225* (2006.01)
*H04N 5/235* (2006.01)
*H04N 5/33* (2006.01)

(52) U.S. Cl.
CPC ........... *G01J 3/0264* (2013.01); *G01J 3/0286* (2013.01); *G01J 3/0291* (2013.01); *G01J 3/28* (2013.01); *G06K 9/6256* (2013.01); *G06K 9/6267* (2013.01); *H04N 5/2252* (2013.01); *H04N 5/2351* (2013.01); *H04N 5/2353* (2013.01); *H04N 5/332* (2013.01); *G01J 2003/2826* (2013.01)

(58) Field of Classification Search
USPC ........................................................ 348/143
See application file for complete search history.

(56) References Cited

U.S. PATENT DOCUMENTS

| | | | |
|---|---|---|---|
| 2005/0213960 A1* | 9/2005 | Baldwin | G03B 17/02 396/439 |
| 2007/0069137 A1* | 3/2007 | Campbell | A61B 6/56 250/363.02 |
| 2009/0196593 A1* | 8/2009 | Cheng | G03B 17/00 396/155 |
| 2010/0245833 A1* | 9/2010 | Shah | G01J 3/02 356/456 |
| 2013/0038725 A1 | 2/2013 | Lanoue et al. | |

OTHER PUBLICATIONS

Written Opinion, dated Apr. 5, 2016, for PCT/AU2016/000004, 5 pages.

\* cited by examiner

HYPERSPECTRAL IMAGER METHOD AND APPARATUS

FIELD OF THE INVENTION

The present invention relates to the field of hyperspectral imaging and, in particular, relates to a compact hyperspectral imager adapted to operate in harsh environments and to post acquisition signal processing to provide automated and improved hyperspectral processing results.

REFERENCES

Ben-Dor E, Patkin K, Banin A, Karnieli A (2002) Mapping of several soil properties using DAIS-7915 hyperspectral scanner data—a case study over clayey soils in Israel. Int J Remote Sens 23, 1043-1062.

Bierwirth P, Huston D, Blewett R (2002) Hyperspectral Mapping of Mineral Assemblages Associated with Gold Mineralization in the Central Pilbara, Western Australia. Economic Geology 97, 819-826.

Chabrillat S, Goetz A F H, Krosley L, Olsen H W (2002) Use of hyperspectral images in the identification and mapping of expansive clay soils and the role of spatial resolution. Remote Sens Environ 82, 431-445.

Clark R N, Roush T L (1984) Reflectance spectroscopy: Quantitative analysis techniques for remote sensing applications. J Geophys Res 89, 6329-6340.

Clark R N, Swayze G A, Livo K E, Kokaly R F, Sutley S J, Dalton J B, McDougal R R, Gent C A (2003) Imaging spectroscopy: Earth and planetary remote sensing with the USGS Tetracorder and expert systems. Journal of Geophysical Research: Planets 108, 5131.

Congalton R G, Oderwald R G, Mead R A (1983) Assessing Landsat classification accuracy using discrete multivariate-analysis statistical techniques. Photogrammetric Engineering and Remote Sensing 49, 1671-1678.

Cudahy T J, Ramanaidou, E. R., 1997. Measurement of the hematite:goethite ratio using field visible and near-infrared reflectance spectrometry in channel iron deposits, western Australia. Australian Journal of Earth Sciences 44, 411-420.

Daughtry C S T, Hunt E R, McMurtrey J E (2004) Assessing crop residue cover using shortwave infrared reflectance. Remote Sens Environ 90, 126-134.

Elvidge C D (1988). Vegetation reflectance features in AVIRIS data, Sixth Thematic Conference on Remote Sensing for Exploration Geology. Environmental Research Institute of Michigan, Houston, Tex., pp. 169-182.

Goetz A F H (2009) Three decades of hyperspectral remote sensing of the Earth: A personal view. Remote Sens Environ 113, S5-S16.

Hecker C, van der Meijde M, van der Werff H, van der Meer F D (2008) Assessing the Influence of Reference Spectra on Synthetic SAM Classification Results. IEEE Transactions on Geoscience and Remote Sensing 46, 4162-4172.

Hosek, L., Wilkie, A.: An analytic model for full spectral sky-dome radiance. ACM Transactions on Graphics (TOG) 31 (2012) 1-9.

Hosek, L., Wilkie, A.: Adding a Solar-Radiance Function to the Hošek-Wilkie Skylight Model. Computer Graphics and Applications, IEEE 33 (2013) 44-52.

Hudson W D, Ramm C W (1987) Correct formulation of the Kappa Coefficient of Agreement. Photogrammetric Engineering and Remote Sensing 53, 421-422.

Jiang L, Zhu B, Rao X, Berney G, Tao Y (2007) Discrimination of black walnut shell and pulp in hyperspectral fluorescence imagery using Gaussian kernel function approach. J Food Eng 81, 108-117.

Kohram M, Sap M (2008) Composite Kernels for Support Vector Classification of Hyper-Spectral Data, MICAI 2008: Advances in Artificial Intelligence, pp. 360-370.

Kokaly R F, Despain D G, Clark R N, Livo K E (2003) Mapping vegetation in Yellowstone National Park using spectral feature analysis of AVIRIS data. Remote Sens Environ 84, 437-456.

Kruse F A, Lefkoff A B, Dietz J B (1993). Expert system-based mineral mapping in northern death valley, California/Nevada, using the Airborne Visible/Infrared Imaging Spectrometer (AVIRIS). Remote Sens Environ 44, 309-336.

Mather P M (2004) Computer processing of remotely-sensed images, 3rd ed. John WIley and Sons, Chichester, U K.

Melkumyan A, Nettleton E (2009) An observation angle dependent nonstationary covariance function for gaussian process regression. Lecture Notes in Computer Science 5863, 331-339.

Melkumyan A, Ramos F (2011) Multi-Kernel Gaussian Processes, The International Joint Conference on Artificial Intelligence (IJCAI'11), Barcellona, Spain.

Morris R C (1980) A textural and mineralogical study of the relationship of iron ore to banded iron formation in the Hamersley iron province of Wester Australia. Economic Geology 75, 184-209.

Morris R C, Kneeshaw M (2011) Genesis modelling for the Hamersley BIF-hosted iron ores of Western Australia: a critical review. Australian Journal of Earth Sciences 58, 417-451.

Murphy R J (1995) Mapping of jasperoid in the Cedar Mountains, Utah, U.S.A., using imaging spectrometer data. Int J Remote Sens 16, 1021-1041.

Murphy R J, Monteiro S T, Schneider S (2012) Evaluating Classification Techniques for Mapping Vertical Geology Using Field-Based Hyperspectral Sensors. IEEE Transactions on Geoscience and Remote Sensing 50, 3066-3080.

Murphy R J, Wadge G (1994) The effects of vegetation on the ability to map soils using imaging spectrometer data. Int J Remote Sens 15, 63-86.

Plaza A, Benediktsson J A, Boardman J W, Brazile J, Bruzzone L, Camps-Valls G, Chanussot J, Fauvel M, Gamba P, Gualtieri A, Marconcini M, Tilton J C, Trianni G (2009) Recent advances in techniques for hyperspectral image processing. Remote Sens Environ 113, S110-S122.

Rasmussen C E, Williams C K I (2006) Gaussian Processes for Machine Learning. MIT Press.

Reda, I., Andreas, A.: Solar position algorithm for solar radiation applications. Solar energy 76.5 (2004) 577-589.

Schneider S, Murphy R J, Melkumyan A, in press. Evaluating the performance of a new classifier—the GP-OAD: a comparison with existing methods for classifying rock-type and mineralogy from hyperspectral imagery. Journal of Photogrammetry and Remote Sensing.

Taylor, Z., Nieto, J.: A Mutual Information Approach to Automatic Calibration of Camera and Lidar in Natural Environments. In: ACRA. (2012) 3-5

Van, G, Goetz AFH (1988) Terrestrial imaging spectroscopy. Remote Sens Environ 24, 1-29.

BACKGROUND

Any discussion of the background art throughout the specification should in no way be considered as an admission that such art is widely known or forms part of common general knowledge in the field.

Hyperspectral imaging is an important resource in the analysis of imagery to determine attributes of an image. In hyperspectral imaging, a range of wavelengths is intensity profiled for each pixel in an image. Through analysis of the spectral response of each pixel in the captured imagery, attributes of the captured image can be determined. Hyperspectral imaging therefore has particular application to the analysis of the resources in a geographic environment. Hyperspectral imaging is also valuable in the general analysis of geographic features in an image.

Unfortunately, hyperspectral imaging often has to take place in extremely hostile environments. For example, when utilised in a harsh mining environment, the hyperspectral imaging device is often exposed to environmental extremes. FIG. 40 illustrates one form of hyperspectral image capture in a mining environment.

Further, the captured imagery can often include a range of significant defects such that captured hyperspectral images may require extensive post processing to enhance features of the captured images. For example, the captured imagery, in a natural environment, may have significant shadow effects causing illumination variances, and significant directional reflection variation from the captured surfaces.

SUMMARY OF THE INVENTION

It is an object of the invention to provide an improved form of hyperspectral imager and post processing to provide improved hyperspectral outputs and/or to at least provide a useful alternative to existing solutions.

In accordance with a first aspect of the present invention, there is provided a hyperspectral imager for imaging external environments, the imager including: an optical line scanner unit adapted to perform line scans of an external environment via rotation thereof; an environmental enclosure providing a first degree of temperature and dust isolation from the environment, the enclosure mounted on a rotatable platform; a rotatable platform attached to the environmental enclosure, adapted to rotate the environmental enclosure unit and optical line scanner unit under the control of an electronic control system; a thermo electric cooler unit attached to the environmental enclosure for cooling the enclosure, thereby maintaining the enclosure at a substantially stable temperature during operations; and an electronic control system for controlling the thermo electric cooler unit, and the optical line scanner unit, and the rotation system.

The hyperspectral imager can further include a dessicant port and holding bay for holding a desiccant for providing humidity control to the enclosure. The thermo electric cooler unit can be mounted on top of the enclosure. The rotatable platform can be driven by a cable chain to manage cable movement and prevent breakage. The environmental enclosure preferably can include at least one optical aperture for projection of an optical lens of the optical line scanner unit.

In accordance with a further aspect of the present invention, there is provided a method for luminance processing of a captured hyperspectral image, the method including iteratively processing the series of hyperspectral images through the steps of: (a) capturing a hyperspectral image of a geographical environment utilising a current exposure level; (b) determining a saturation proportion being the ratio of the number of spectral channels at an upper saturation limit to the total number of spectral channels; and (c) if the saturation proportion is above a predetermined threshold, reducing the current exposure level.

In accordance with a further aspect of the present invention, there is provided a method for luminance processing of a hyperspectral image, the method including iteratively processing the series of hyperspectral images through the steps of: (a) determining a comparison between a reference spectrum and a captured spectrum; and (b) where the captured spectrum exceeds the reference spectrum by a predetermined amount, reducing the exposure of the reference spectrum by a predetermined amount.

In accordance with a further aspect of the present invention, there is provided a method of iteratively adjusting the exposure level of a captured hyperspectral image, the method including the steps of: determining a first level of brightness of a frame of the captured image; comparing the first level of brightness to a predetermined desired level of brightness; determining a logarithm difference measure between the first level of brightness and the desired level of brightness; and adjusting the exposure level of the image in accordance with the logarithm difference measure.

Only predetermined wavelength bands of the hyperspectral image are preferably utilised in calculation of the first level of brightness. The iterative process initially starts with a low exposure level.

In accordance with a further aspect of the present invention, there is provided a method of processing hyperspectral images in order to classify its constituent parts, the method including the steps of: (a) deriving a non-stationary observation angle dependent probabilistic model for the hyperspectral imagery; (b) training the probabilistic model parameters on mineral samples obtained from artificial light reflectance measurements; and (c) utilising the probabilistic model on hyperspectral imagery acquired from sampling geographical conditions under natural lighting conditions, to classify constituent parts of the hyperspectral imagery.

In some embodiments, the probabilistic model comprises a non-stationary covariance function. The probabilistic model can comprise a non-stationary observation angle dependant covariance function (OADCF). The probabilistic model can include a multi task Gaussian process. In some embodiments, the training step includes training the images on reflectance spectra obtained utilising artificial lighting. The probabilistic model can include a multi task Gaussian process utilising a non stationary covariance function that is lumination invariant. The probabilistic model can be a multi task covariance function. The probabilistic model can be derived from a portion of the hyperspectral imagery that include low levels of atmospheric absorption.

In accordance with a further aspect of the present invention, there is provided a method of processing hyperspectral imagery captured under natural lighting conditions, the method including the steps of: (a) capturing a hyperspectral image of an external environment in natural illumination conditions; (b) capturing overlapping range data of the surfaces in the external environment; (c) utilising the overlapping range data to decompose the external environment into a series of patches (or a mesh); (d) performing an inverse rendering of light absorption on each patch to determine level of reflectance of the patch, by a sun light source, ambient sky illumination and surrounding patches; and (e) utilising the level of reflectance of each patch to alter the level of corresponding pixels within the hyperspectral image.

In some embodiments, the inverse rendering can comprise an inverse radiosity rendering.

In accordance with a further aspect of the present invention, there is provided a method of processing hyperspectral imagery captured under natural lighting conditions, the method including the steps of: (a) capturing a hyperspectral image of an external environment in natural illumination conditions; (b) capturing overlapping range data of the surfaces in the external environment; (c) utilising the overlapping range data to decompose the external environment into a series of patches (or a mesh); (d) performing an inverse radiosity rendering on each patch to determine level of reflectance of the patch, by a sun light source, ambient sky illumination and surrounding patches; and (e) utilising the level of reflectance of each patch to alter the level of corresponding pixels within the hyperspectral image.

In some embodiments, the step (c) further comprises tessellating the patches. The step (c) can also include adaptive subdivision of the range data into a series of patches. The step (d) can include performing a form factor estimation for said series of patches. The steps (d) and (e) can be repeated for each wavelength of the captured hyperspectral image.

BRIEF DESCRIPTION OF THE DRAWINGS

Embodiments of the invention will now be described, by way of example only, with reference to the accompanying drawings in which:

FIGS. 35, 36 and 37 are image pixel spectra extracted from different areas of the image classified as Shale 2 by SAM and Shale 3 by MTGP. The location of absorption features caused by ferric iron ($Fe^{3+}$) and Fe—OH are indicated in FIG. 37. A selection of the individual training spectra used to train MTGP is shown in FIG. 38, including spectra with a small (black line) and large (grey line) slope between 1000 nm and 1300 nm.

DETAILED DESCRIPTION

An embodiment of the present invention provides a system and method for the capture and processing of high quality hyperspectral images in a harsh environment.

Figure 1:
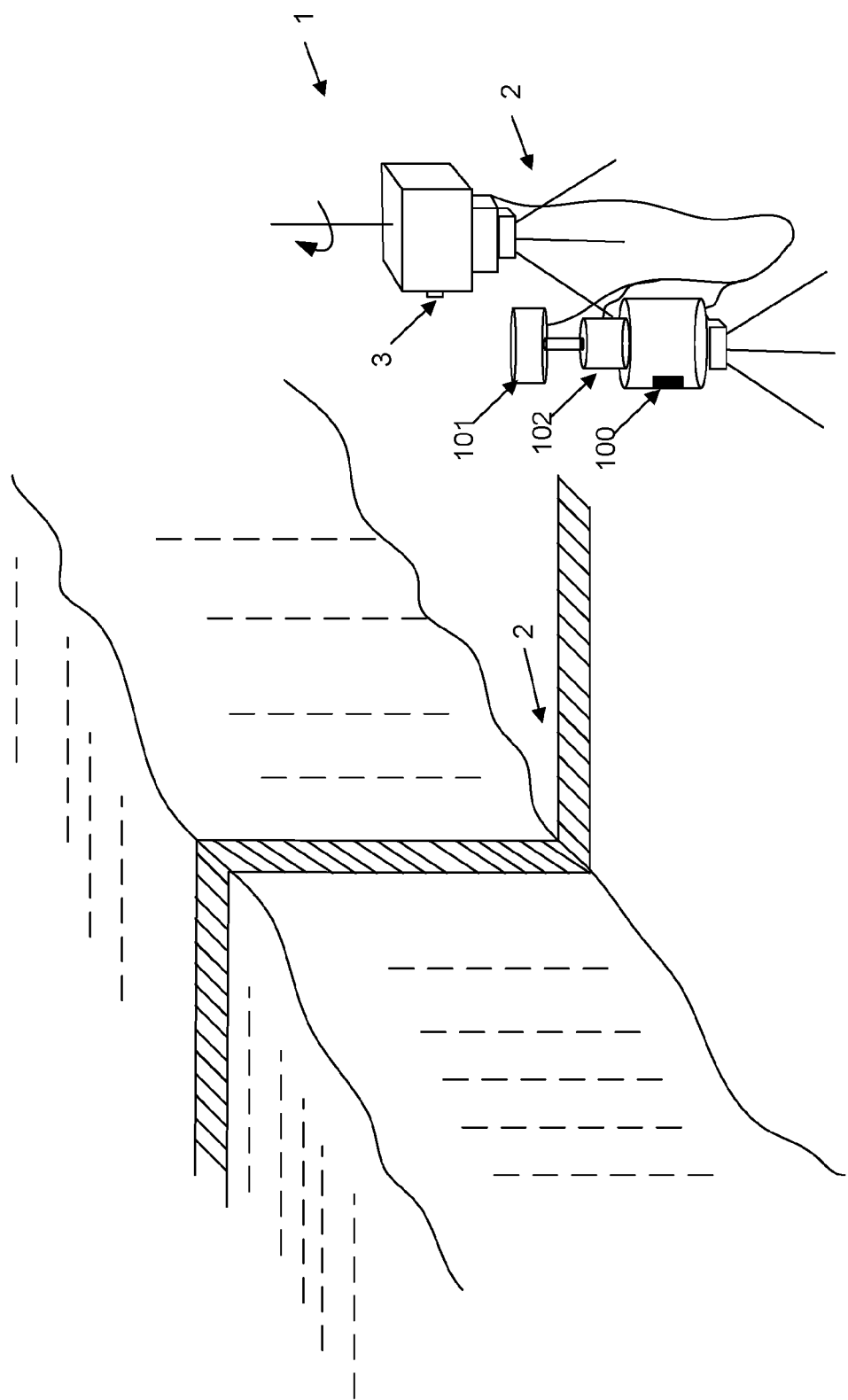
FIG. 1 illustrates schematically the operation of environmental scanning by a hyperspectral imager.

Turning initially to FIG. 1, there is illustrated schematically the hyperspectral imager 1 of a preferred embodiment which is rotatably mounted on a tripod 2, so that during rotation, lensing system 3 can image part 4 of an environment whilst it undergoes a controlled rotation. The hyperspectral imager thereby captures a vertical line image which is swept out via horizontal rotation.

In addition, the preferred embodiment interacts with an independent Light Detection and Ranging (LIDAR) system 100 such as a LIDAR RIEGL laser scanner, for capturing range data, a GPS tracker 101 for accurate position determination, and an inertia management unit (IMU) 102 for a more accurate determination of position.

Figure 2:
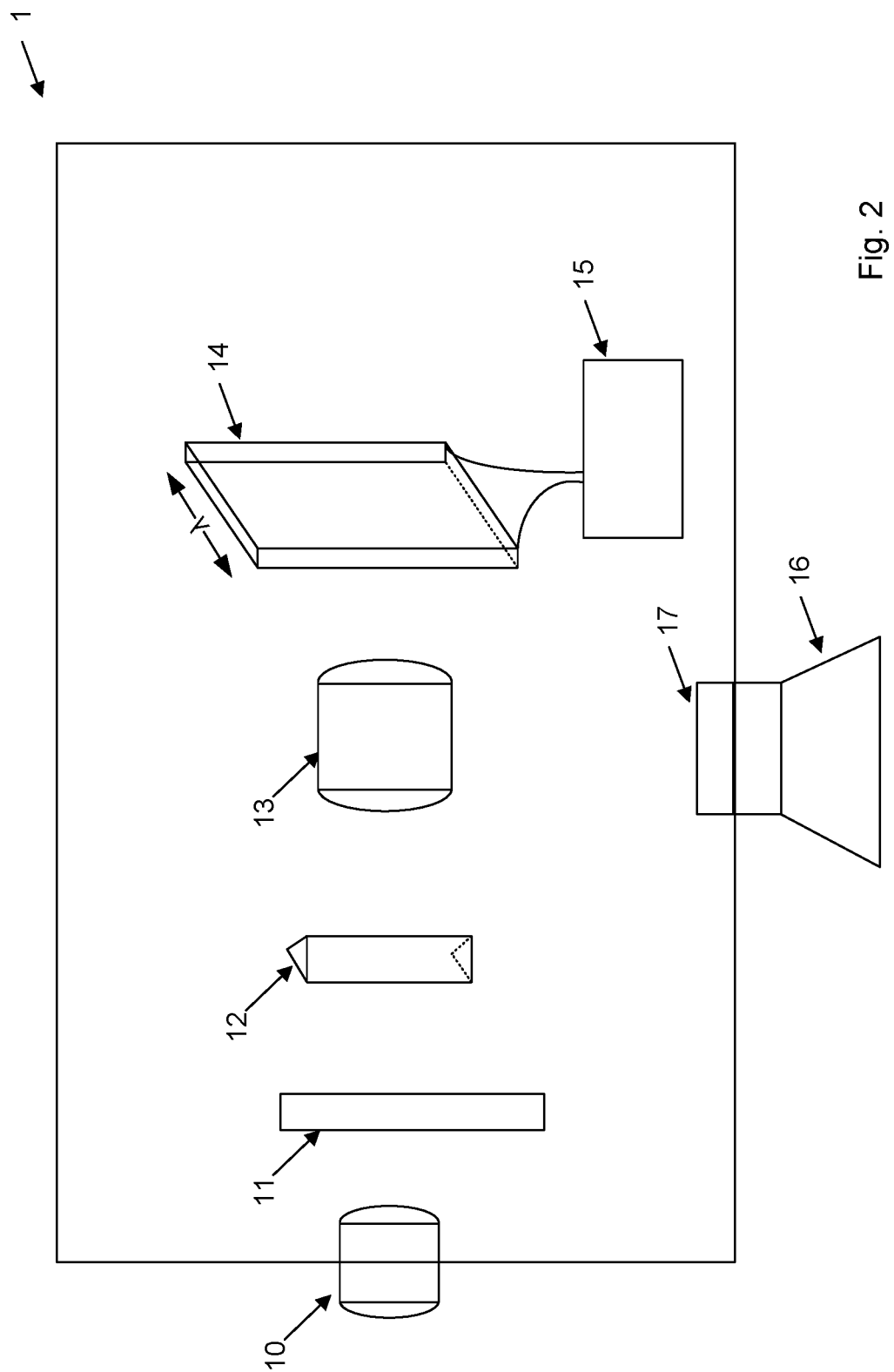
FIG. 2 illustrates schematically the main signal processing components of a hyperspectral imager.

Turning now to FIG. 2, there is illustrated the imaging optics train of the hyperspectral imager 1 in more detail. Initially, the optical line scanner unit input is conditioned by input imaging lens 10. Subsequently, aperture control 11 modulates the intensity of signal passed through the optical train. Subsequently, dispersion optics 12 act to disperse the signal into wavelength selective components. Collimating optics 13 acts to collimate the dispersed beam before it is imaged by imaging array 14. The imaging array 14 acts to repeatedly capture the dispersed wavelength signal, which is stored in frame buffer store 15, for subsequent processing and analysis. Examples of the imaging unit can include the a line scanning imager available from Specim, of Oulu, Finland, model Aisa FENIX.

While the arrangement of FIG. 1 illustrates schematically the optical train processing required for the capture of hyperspectral images, the operation of the hyperspectral imaging equipment in a harsh environment calls for unique characteristics to ensure continued, substantially automated, operation.

Figure 3:
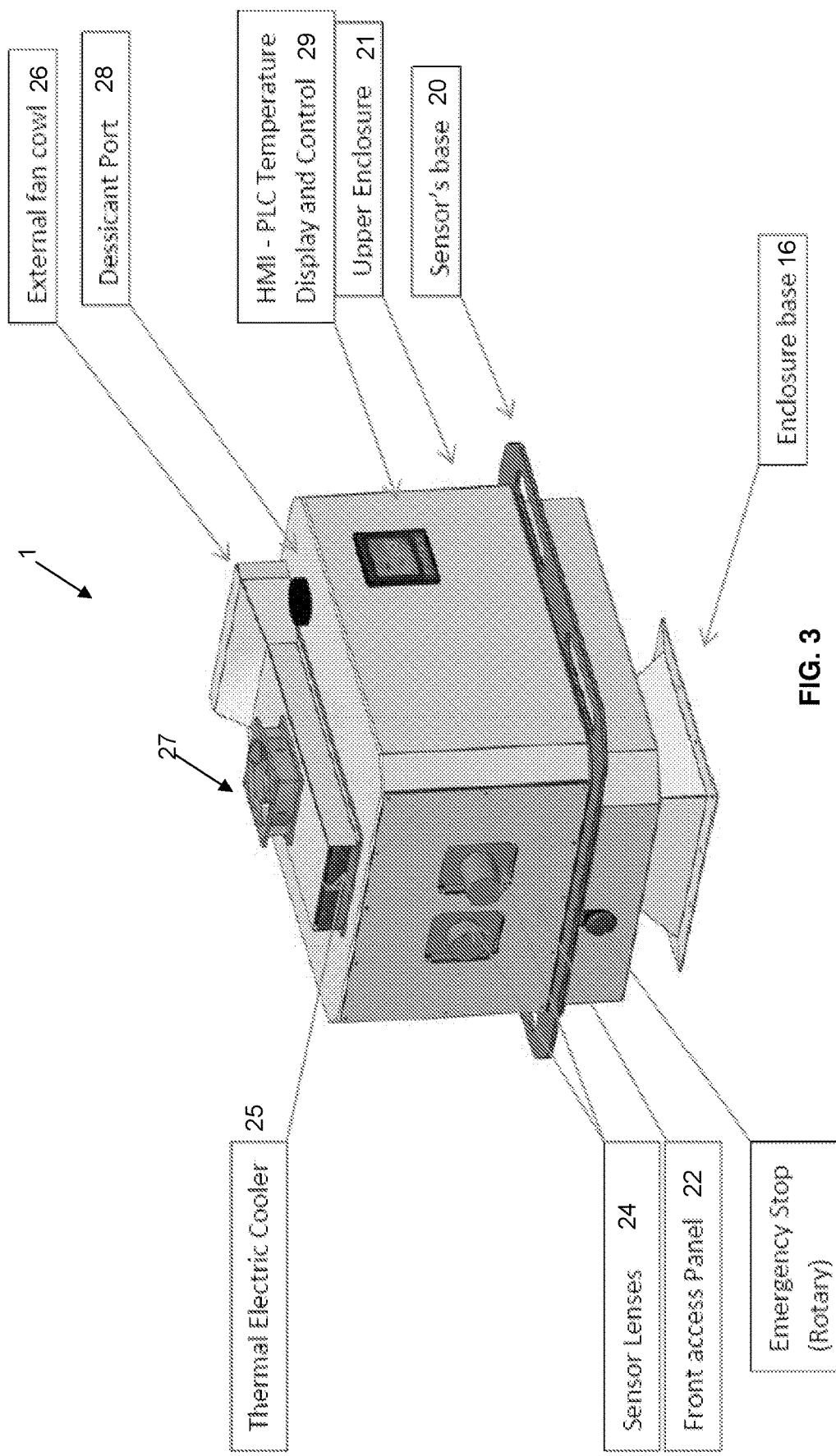
FIG. 3 illustrates a side perspective view of a hyperspectral imager of one embodiment.

Turning now to FIG. 3, there is illustrated a side perspective view of hyperspectral imager 1. The imager 1 is mounted on an enclosure base 16 upon which it rotates, and is formed from a sensor base unit 20 and upper enclosure 21. A front access panel 22 includes two apertures for the sensor lenses 24. Upper enclosure 21 includes a polystyrene insulation lining, which provides thermal isolation, and is cooled by a thermal electric cooler unit 25, which includes exhaust fan 27 and second external fan cowl 26 for filtered input air. A desiccant port 28 is also provided. An external display control 29 is also provided for overall control of imager 1.

Figure 4:
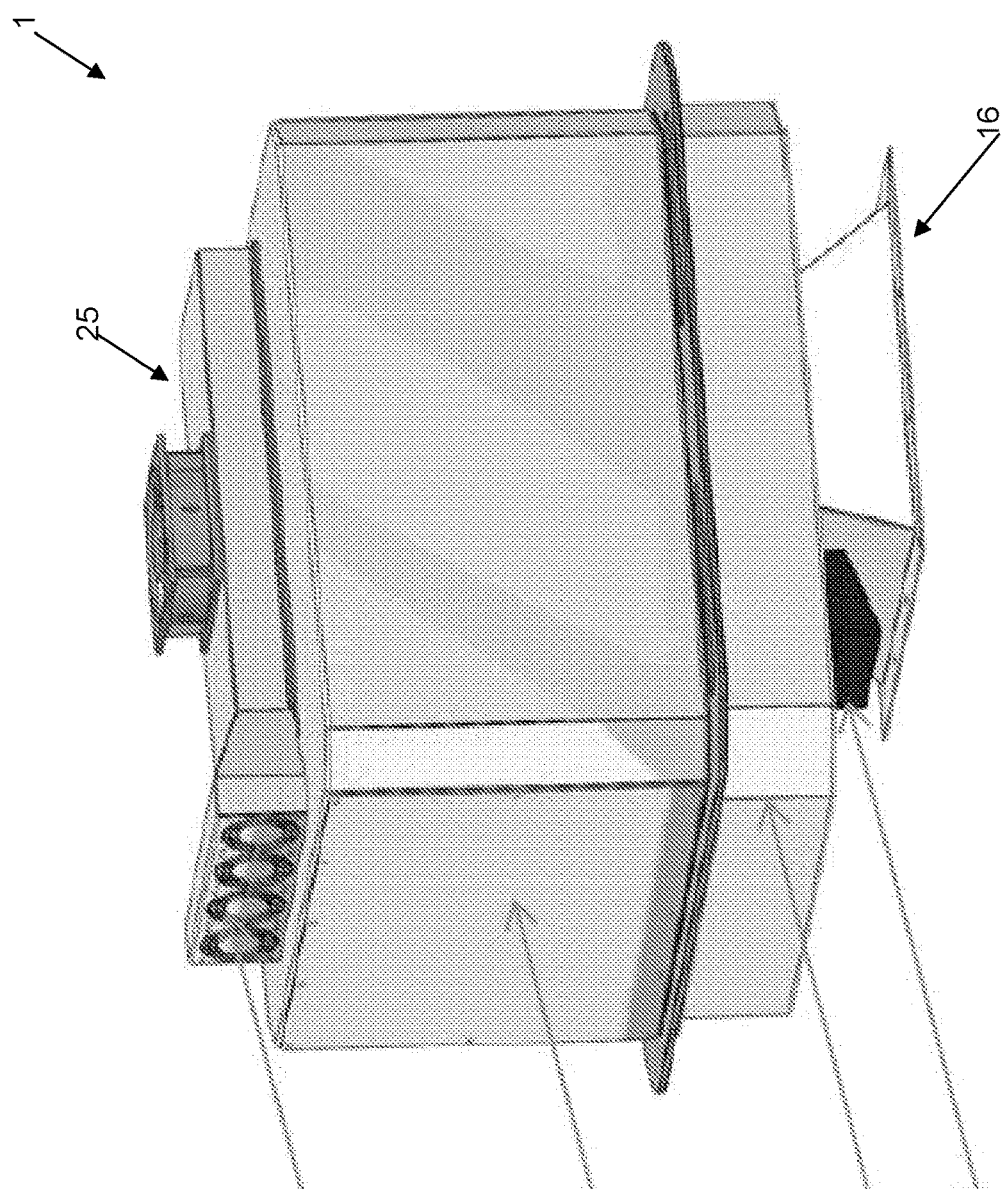
FIG. 4 illustrates a back side perspective view of a hyperspectral imager of one embodiment.

Turning now to FIG. 4, there is shown a back side perspective view of imager 1. In this arrangement, it can be seen that the base 16 includes a cable entry gland 30 for the ingress and egress of cables. The bottom enclosure 31 is rotatably mounted to the base 16. The top enclosure also includes a back access panel 32. The thermo electric cooler unit 25 includes a series of fans 33 to move air through the thermal electric cooler units' heat sinks.

Figure 5:
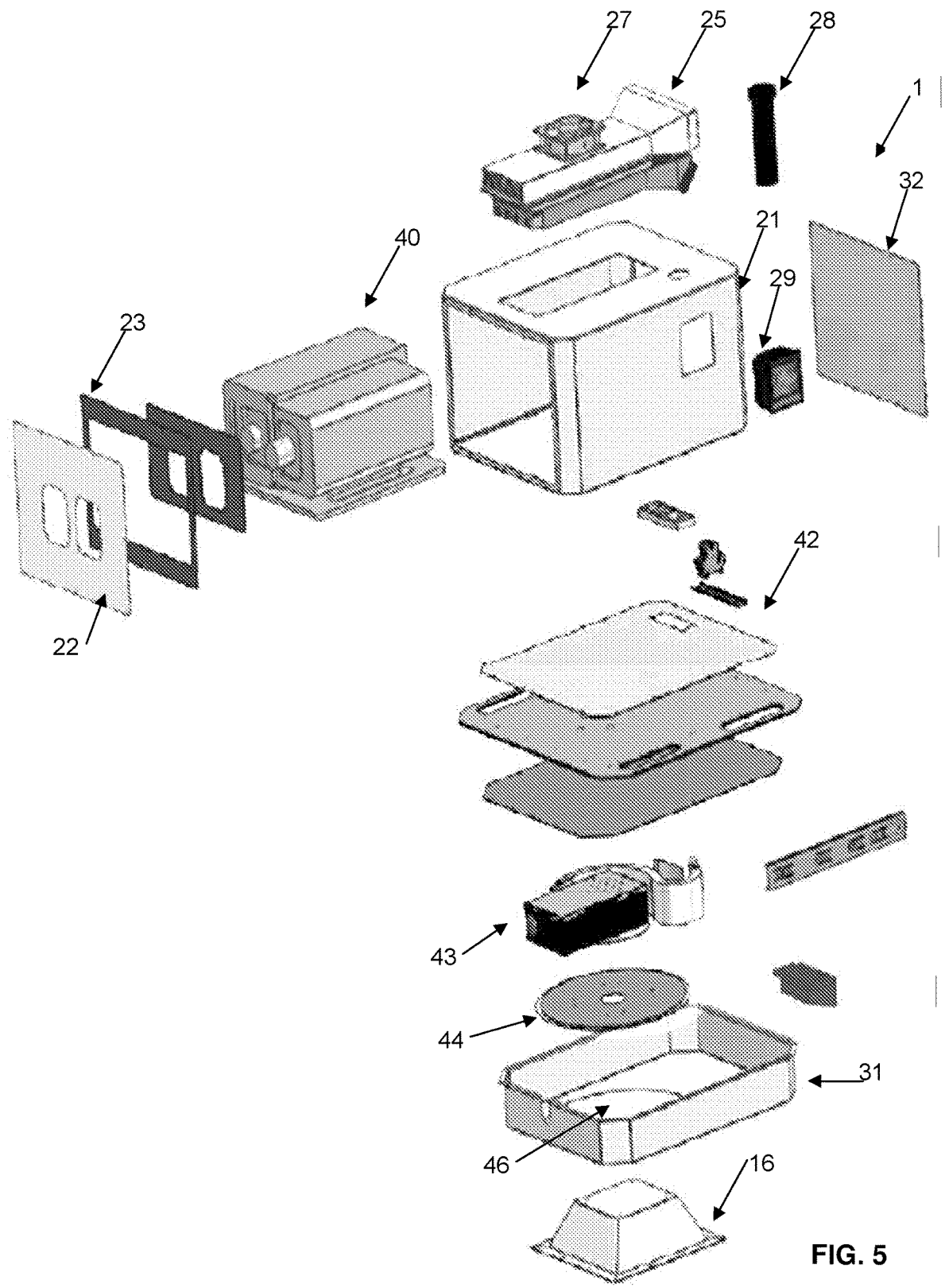
FIG. 5 illustrates an exploded perspective view of a hyperspectral imager of one embodiment.

Turning now to FIG. 5, there is illustrated an exploded perspective of the imager 1 illustrating the internal portions thereof.

The desiccant unit 28 is provided for the control of internal humidity and can include absorbing crystals therefore. The upper enclosure 21 encloses a hyperspectral imaging unit 40, which can comprise a line scanning imager available from Specim, of Oulu, Finland, model Aisa FENIX. The imaging unit 40 is mounted on a base 42. The imaging unit projects through front access panel 22 to image a scene. The panel 22 can further include a series of gasket plates 23 to isolate the imager from the external environment. The Base 42 is in turn mounted on a rotation unit 43, which controls the rotation of the imager. The rotation unit is mounted on disc 44, which is in turn affixed to base 16 through aperture 46.

Figure 6:
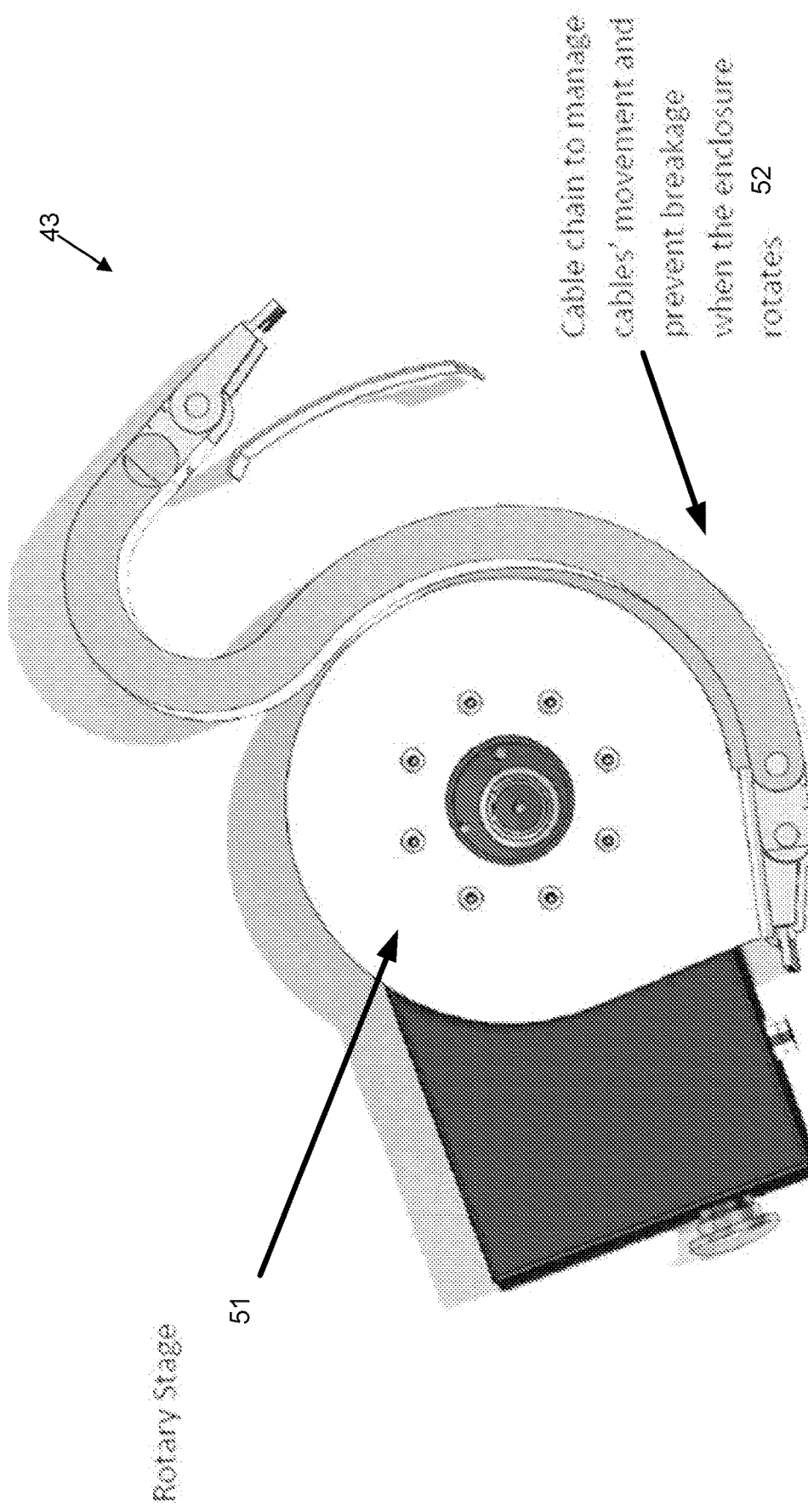
FIG. 6 illustrates a top perspective view of a rotary stage assembly of one embodiment.

FIG. 6 illustrates a top perspective view of the rotary stage assembly 43. The assembly includes a rotary stage 51, which rotates as a result of a chain pulling the rotary stage. The cable chain 52 rotates the stage and provides cable slack for managing cable movement and preventing cable breakage during rotation.

The hyperspectral imager unit 1 provides protection of the imaging unit 40 from environmental elements and also provides a controlled temperature environment. This protects the imaging unit from dust and water particles, in addition to temperature changes. The enclosed nature of the imaging unit simplifies the preparation process for each use and prevents physical damage to the sensor. Further, the integrated rotary base and cable management system minimises cable breakages.

The arrangement of the preferred embodiment also provides a universal sensor, which can be used in multiple configurations. For example, the imager can be also be readily adapted to a tripod, laboratory environment, moving vehicle or other harsh or hazardous environment such as farming or mining environments.

As shown in FIG. 5, the assembled arrangement is fully enclosed so as to prevent the ingress of dust, water or insects. Overall temperature control is provided by the use of a thermoelectric cooler unit. Moisture and condensation is controlled by the use of the desiccant tube 28. The outer surfaces of the imager can be painted with a high reflectivity paint on external surfaces and an internal insulation foam used to isolate the internal portion of the imager from direct sunlight, thereby further enhancing temperature control.

Figure 7:
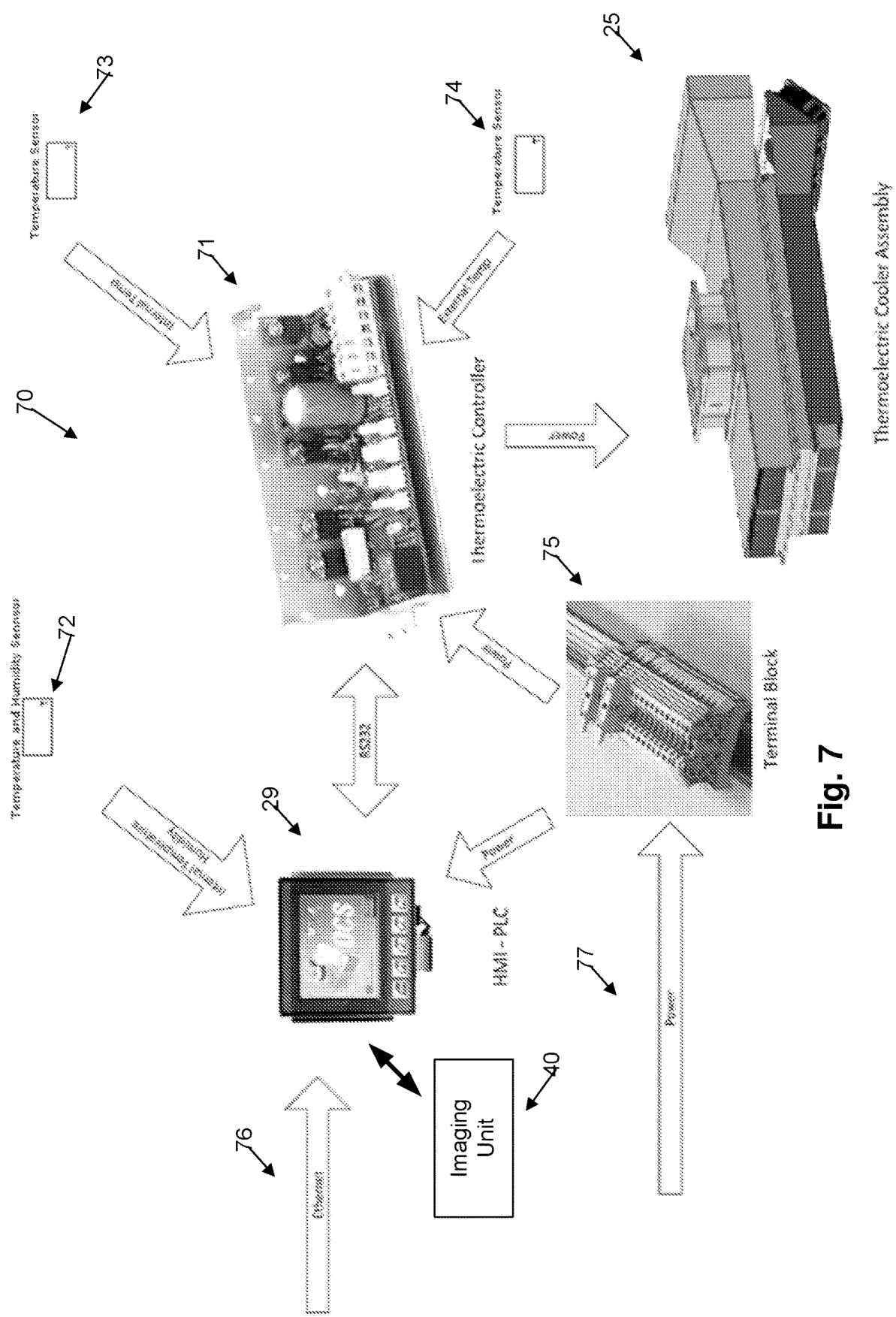
FIG. 7 illustrates schematically the interaction of electrical components of one embodiment.

FIG. 7 illustrates the electrical control of the temperature environment. An internal thermoelectric controller 71 takes inputs from an internal temperature sensors 72, 73 and an external temperature sensors 74 to activate the thermo electric cooler unit 25 on demand. The HMI-PLC 29 monitors the operation of the environment using temperature and humidity sensor 72. Inputs include External Ethernet input 76 and power inputs 77. Power inputs 77 go to a terminal block 75, which provides power distribution to the elements of the imager. The micro HMI-PLC 29 displays the set points for the internal thermoelectric controller 71, which controls the thermo electric cooler unit 25. Depending on the size of the sensors, the entire sensors and image processing computer can be mounted inside enclosures 21 and 31 (FIG. 5), providing total protection and simplifying wiring. The thermoelectric cooler unit 25 can work as a cooler or a heater.

Image Capture and Processing

As discussed with reference to FIG. 1, the hyperspectral imager acts to capture imagery of a scene. The image can be stored for future processing or processed on board by on board DSP hardware or the like.

Figure 8:
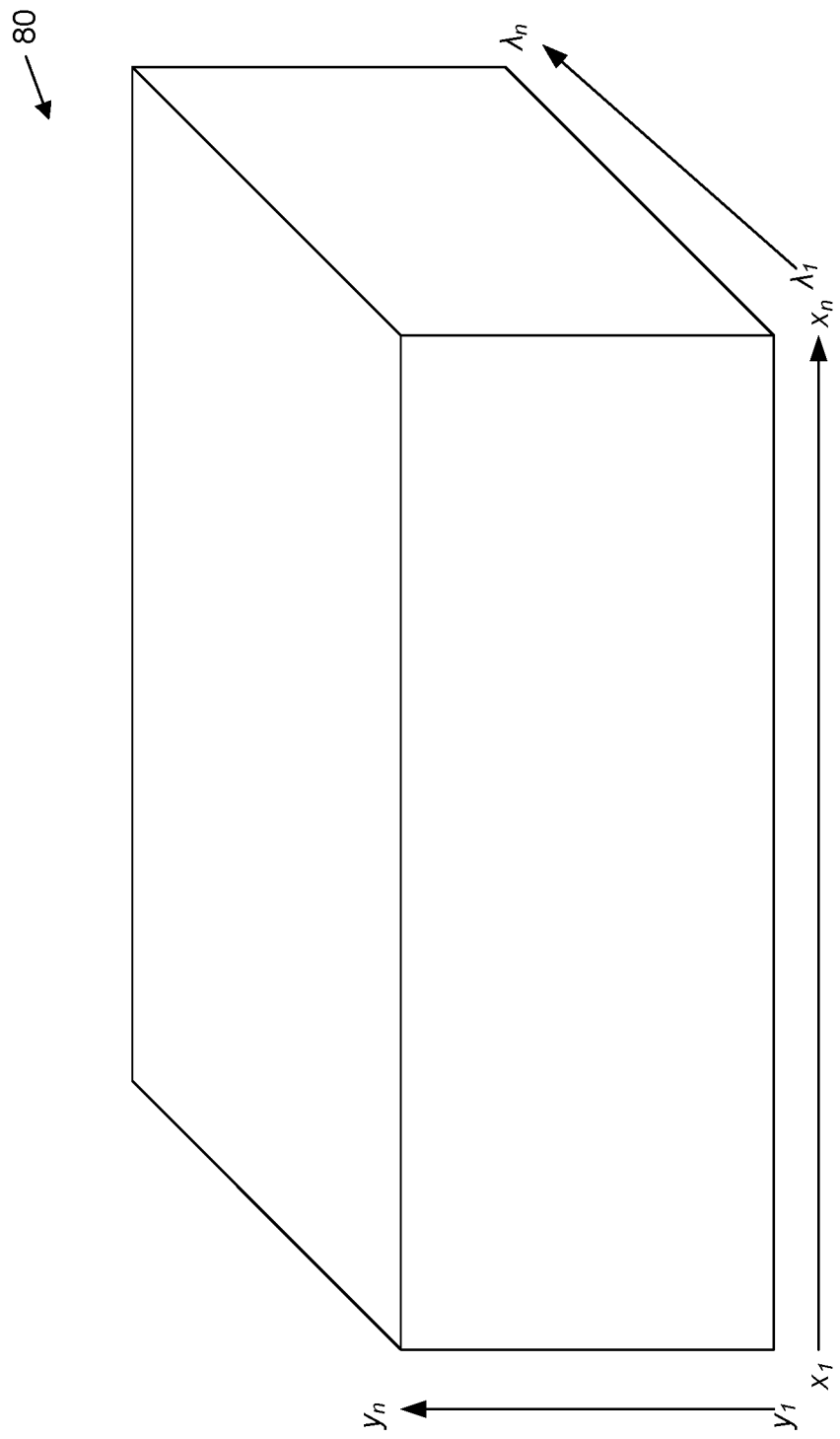
FIG. 8 illustrates schematically the storage of hyperspectral images.
Figure 11:
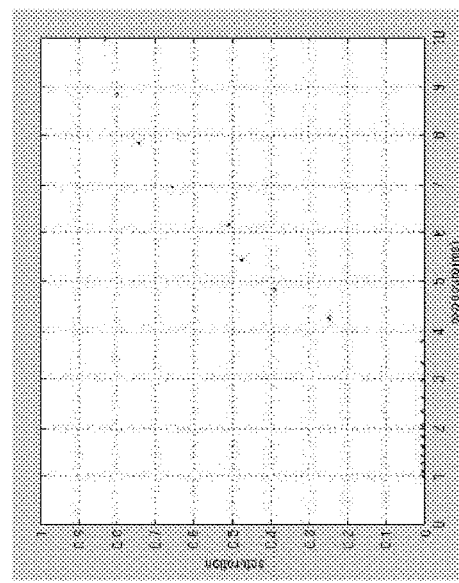
FIG. 9 to FIG. 26 are graphs of different forms of luminance processing of images.
Figure 14:
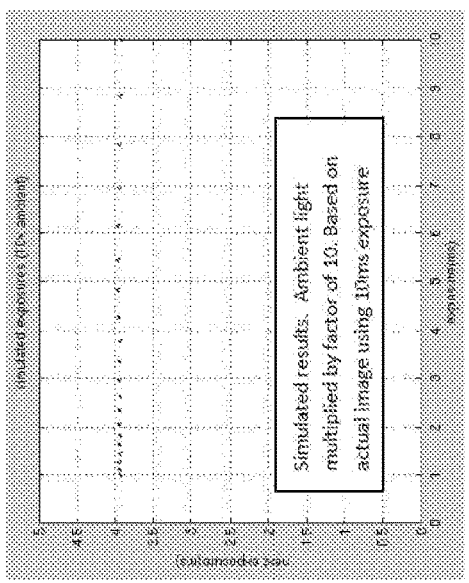

The captured imagery includes, for each pixel in a current strip 4 located in the hyperspectral view, a series of wavelength intensity values. The resulting image can be virtualised as a frame buffer having a 'depth' in wavelength. Turning to FIG. 8, there is illustrated a schematic illustration, where the frame buffer 80 includes a length of coordinates $x_1$ to $x_n$, a height in coordinates $y_1$ to $y_n$ and a depth in wavelength $\lambda_1$ to $\lambda_n$.

Exposure Correction

An initial issue with the captured 'image' is the issue of exposure correction. Traditional RGB exposure correction is well known. For example, an extensive discussion is provided in chapter 12 of Giuseppe Messina, Sebastiano Battiato, and Alfio Castorina, Single-Sensor Imaging Methods and Applications for Digital Cameras, Edited by Rastislav Lukac, CRC Press 2008, Pages 323-349, Print ISBN: 978-1-4200-5452-1.

With reference to FIG. 8, in general terms, the "image" 80 within the frame buffer can have a level of brightness (Bpre), as compared to a desired level of brightness (Bopt). The image's "exposure value", (EVpre, being a combination of the F-Stop and exposure time used to create the image) can be adjusted by the (log of the) difference between the two brightness levels. In this way, over multiple iterations, exposure control forms an integral controller feedback loop, eventually or rapidly reaching steady state with the exposure value EV that achieves the desired level of brightness.

In the processing of the captured image, there's no need to vary from this practice, but there is a lot of flexibility in precisely how to calculate an image's level of brightness. Typically an image will contain many background features that are not interesting to the user. Therefore digital RGB cameras often provide different options for selecting the region of interest, by masking out the uninteresting features, and/or by weighted average.

For a hyperspectral image, only certain wavelength bands may be of significance. Hence, part of the spectrum can be overexposed if it means that the interesting or desired part of the spectrum has a better signal quality.

In consideration of a white-calibration panel, one might appreciate than an exposure can be optimised to give the best possible signal quality at some feature of interest. However, for those conditions, a single calibration panel might be over- or under-exposed. One could optimise exposure for the calibration panel, but then the signal quality at the feature of interest might suffer.

A general solution may be to include in the scene a series of calibration panels of different shades of grey. This would allow the user to direct exposure optimisation to the feature of interest. Subsequent white-calibration would then be able to automatically choose the calibration panel with the best signal quality.

White calibration is orthogonal to auto exposure, but is mentioned here to illustrate that flexibility in choosing the region of interest might be important.

Image Processing—Brightness Level

Digital RGB cameras can calculate brightness as an average over the region of interest. For high-contrast images, this often permits some degree of overexposure of the highlights while bringing out some detail in the shadows that would otherwise be lost in the noise floor.

However for a hyperspectral image, a user might want greater control over exactly what gets over-exposed by explicitly excluding some regions of highlight from the brightness calculation. Or it might make sense for a user to specify that it is acceptable that, for example, 1% of pixels be over-exposed. In that case, it is possible to look at the brightest voxels in the region/spectrum of interest instead of the average brightness (Bopt=brightness of brightest voxel).

The problem of choosing the brightest voxel as representative of the brightness of the image is that it does not in any way indicate the degree of overexposure. Therefore, without special treatment, the feedback control described above is only able to work from an initially under-exposed state.

One simple solution is to calculate a "saturation" statistic, being the ratio of the number of spectral channels that are at the upper signal limit, to the total number of channels in the spectrum. If the saturation statistic is above a (small) threshold, the exposure can be divided by 2.

Another solution is to keep a reference spectrum. For any spectra found to be even slightly saturated, the saturated portions will be replaced by a multiple of the corresponding section of the reference spectrum. The multiplying factor can be determined by comparing the unsaturated portions of the reference and saturated spectrum. In this way, a rough estimate of what the peak signal might be if not confounded by over-exposure can be made, thereby, in many instances, allowing feedback control to operate. If the saturation is too high to allow even this method to work (i.e. only a small portion of the spectrum is not over-exposed), then it is possible to revert to the above technique of dividing the exposure by 2.

Figure 10:
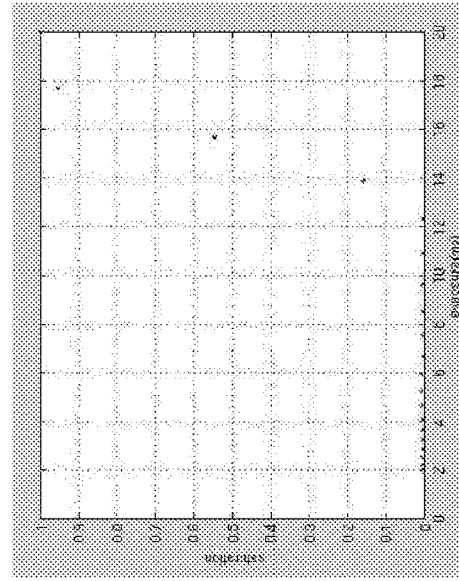
Figure 13:
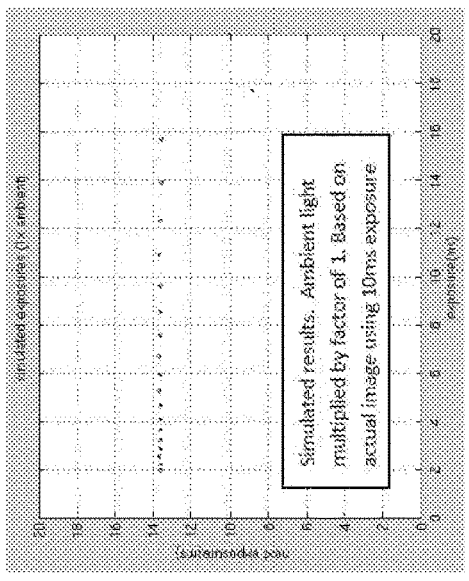
Figure 9:
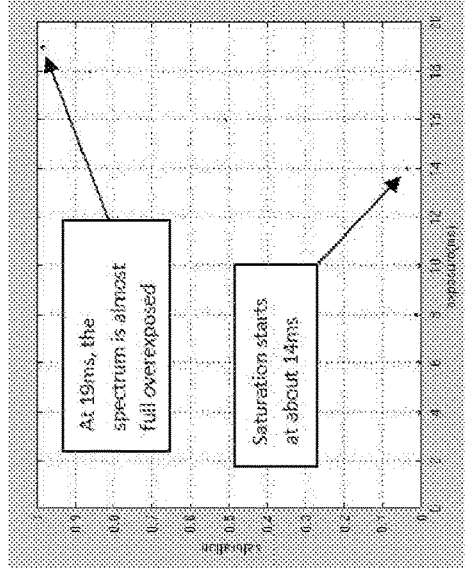
Figure 12:
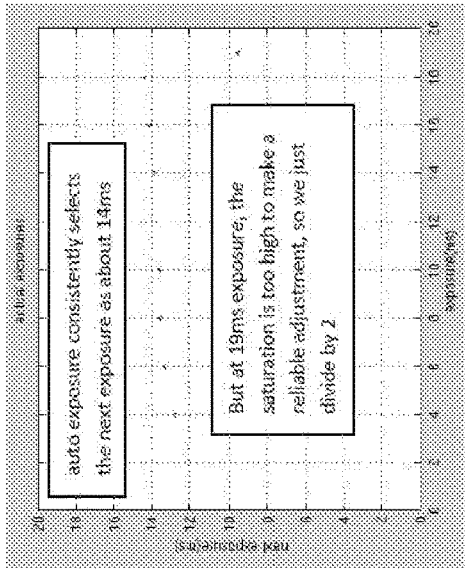
Figure 15:
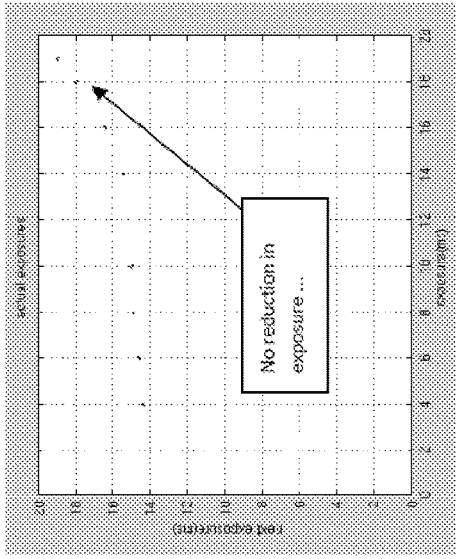
Figure 16:
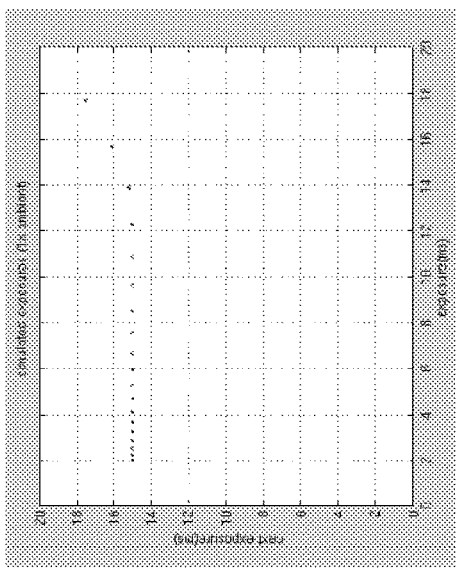
Figure 17:
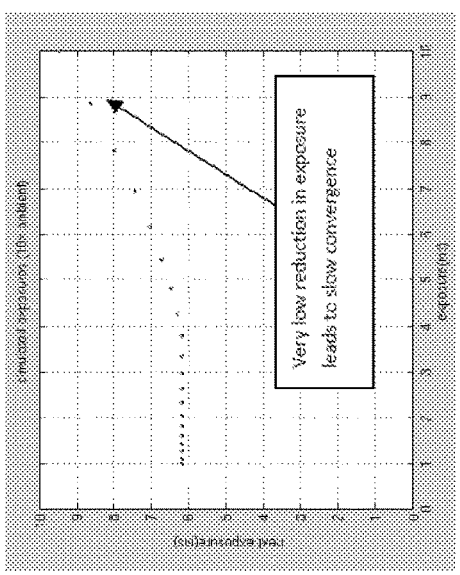
Figure 18:
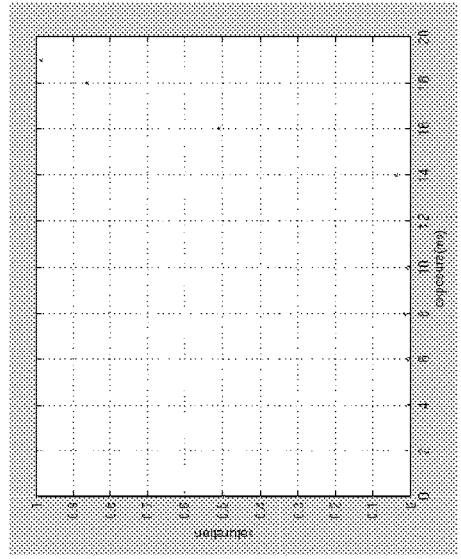
Figure 19:
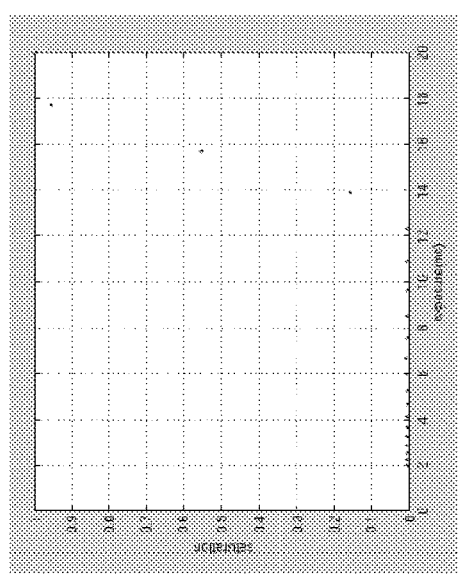
Figure 20:
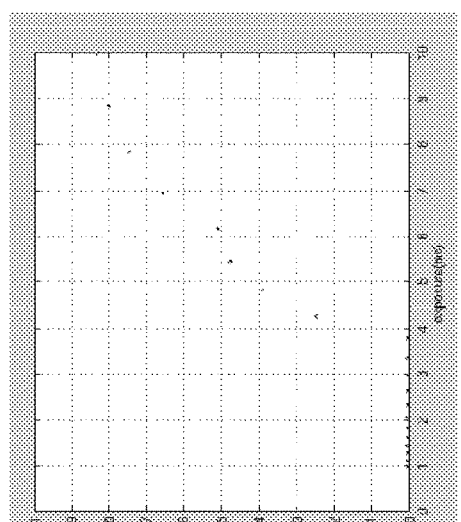
Figure 23:
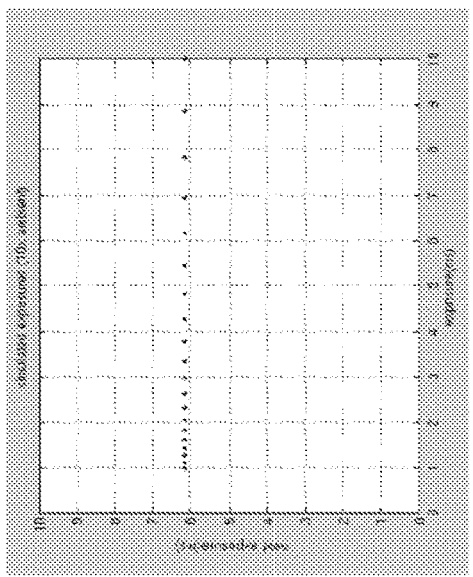
Figure 26:
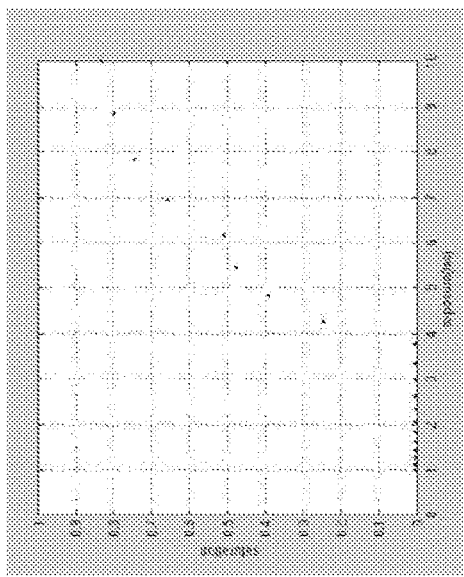
Figure 22:
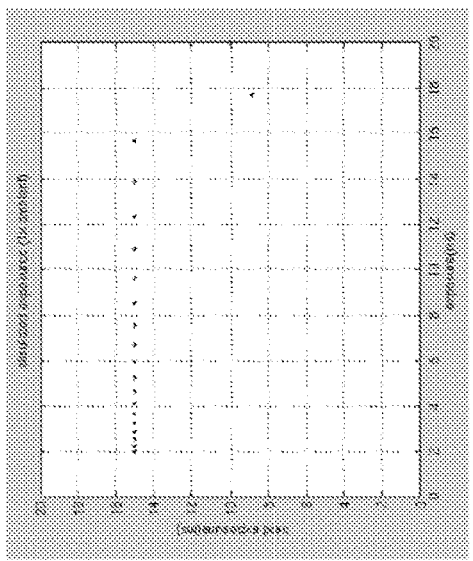
Figure 25:
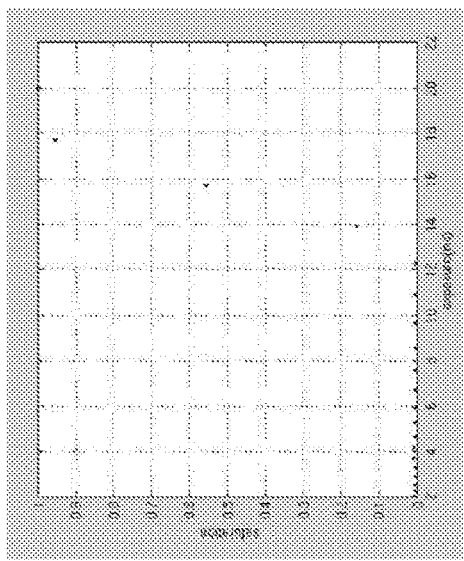
Figure 21:
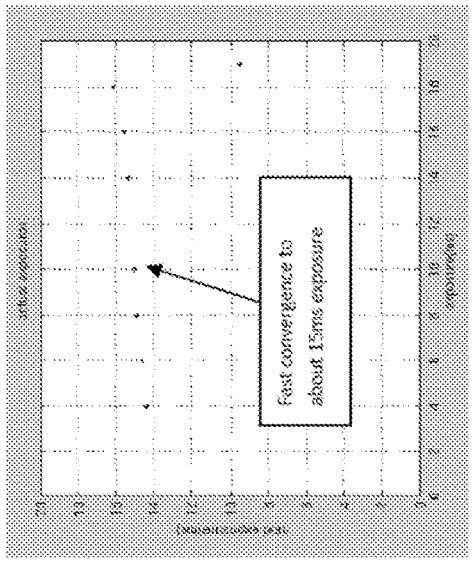
Figure 24:
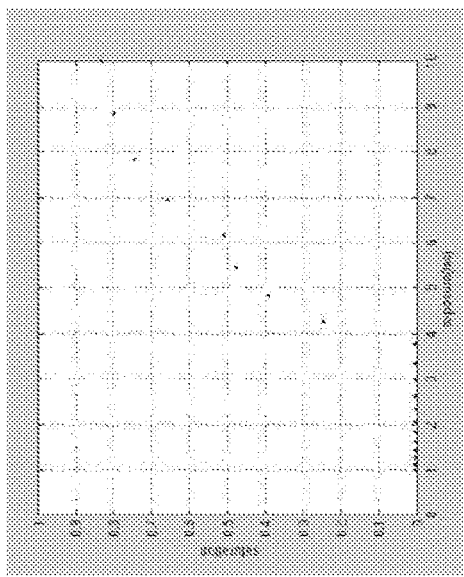

FIG. 9 to FIG. 14 illustrate graphs of the results of this approach on a set of simulated results. In FIG. 9, the auto exposure was consistently set for a number of frames at 14 msec. The resulting images (shown in FIG. 12) showed that saturation started at about 14 msec and at 19 msec the spectrum was almost fully overexposed. FIG. 10 illustrates simulated results where the ambient light is multiplied by a factor of ten with FIG. 13 showing the corresponding exposure. The results show the use of maximum brightness as the feedback set-point, and with a reference spectrum used for estimating maximum brightness of overexposed images. The region of interest was directed too an artificially illuminated calibration panel (Bopt=average brightness of voxels). For comparison, FIG. 15 to FIG. 20 illustrate means brightness with a reference spectrum and directed to the same region of interest in FIG. 9 to FIG. 14. FIG. 21 to FIG. 26 illustrate mean brightness without a reference spectrum. In each case, the same region of interest was analysed.

It was found that without the reference spectrum, convergence is slow for over-exposed images. With the reference spectrum, convergence is much faster. As expected, the steady state solution has some pixels saturated by up to 50%. This can be reduced by reducing the target brightness.

Based on a set of exposures with constant ambient light, the described methodology quickly finds a very good exposure settings with minimal iterations. It also operates over a range of ambient light conditions.

Image Analysis—Illumination Invariance Processing—Calibration

Imaging systems, such as Hyperspectral Imagers, also rely on perception modules that are robust to uneven illumination in the imaged scene. Often, the high dynamic range present in the outdoor environment causes image analysis algorithms to be highly sensitive to small changes in illumination. The method of the present embodiments utilizes sensors commonly found on robotic imaging platforms such as LIDARs, cameras (hyperspectral or RGB), GPS receivers and Inertial Measurement Units (IMUs).

A model is used to estimate the sun and sky illumination on the scene, whose geometry is determined by a "3D point cloud". Through the use of a process of inverse reflectometry, a conversion from the pixel intensity values into a corresponding reflectance form is undertaken, with the illumination and geometry being independent and a characteristic of the material. The inverse reflectometry process provides a per-pixel calibration of the scene and provides for improved segmentation and classification. In the embodiments, it is used to provide a per-pixel calibration of hyperspectral images for remote sensing purposes, specifically, those used in conjunction with the hyperspectral cameras.

Robotic and remote sensing platforms often capture a broad range of information through the multiple onboard sensors such as LIDARs 100, GPS receivers 101, IMUs and cameras 1 (including hyperspectral, RGB and RGB-D). In the outdoor environment, images tend to contain a high dynamic range due to the combination of the sun and sky as illumination sources, and the scene geometry which can induce uneven and indirect illumination of the captured hyperspectral imagery. This can have a detrimental impact on subsequent algorithmic processes ranging from low level corner/edge detection, to high level object segmentation. In the remote sensing field, shadowing in the scene means material classification methods may not operate reliably. It is therefore desirable to generate an illumination independent representation of the scene in a step known as calibration.

In the present embodiment, a per-pixel calibration system is implemented that converts radiance measurements captured by the hyperspectral cameras into a reflectance form that is characteristic of the material in the scene. The system combines the geometric data from a laser scanner 100 with the hyperspectral image captured from a hyperspectral imaging system to form a coloured point cloud. The position and orientation of the sensors are used to approximate the incident illumination on the scene through the use of a sky model. Through the use of an inverse radiosity based approach, an approximation to the reflectance spectra is obtained which can be used for classification algorithms.

Figure 41:
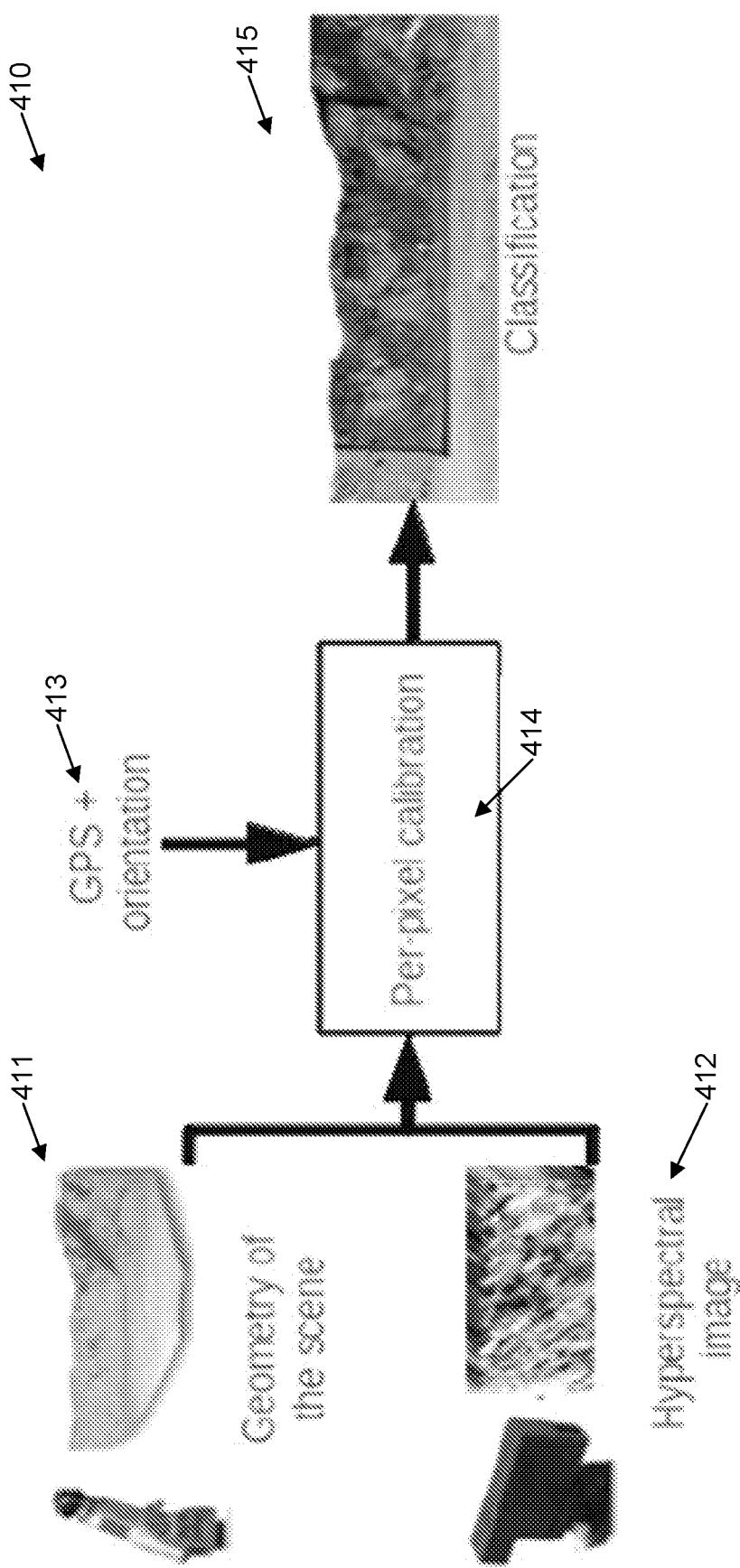
FIG. 41 illustrates the processing train for merging the hyperspectral imagery and scene geometry to determine a luminance invariant version of the hyperspectral image.

FIG. 41 illustrates one form of processing train suitable for use in the present embodiments. In this arrangement 410, the geometry of the scene is captured 411 utilising a LIDAR device (100 of FIG. 1). A hyperspectral image is also captured 412 using a hyperspectral imager 1 of FIG. 1, and the aforementioned luminosity processing applied. GPS position and orientation information is input 413 from a GPS imager 101 (FIG. 1). The information is utilized to create a per pixel calibration 414 to form a coloured point cloud 414 which is used for calibration and classification 415.

The per-pixel calibration process 414 has a number of advantages. Prior techniques of radiometric calibration of hyperspectral images normally involve placing calibration panels of known reflectance in the scene and using the measurements off these too normalise the entire image. This is a manual and labour intensive process and is only correct at the position of the panel. Often imaging can take place in large hostile environments, such as mine sites, where the scene illumination can change dramatically over the imaged scene. As the scene geometry changes and induces occlusions, the illumination varies and so the normalisation process may contain significant errors. The illumination can be uneven across the scene with dependencies on location and orientation as well as the light source. This is perhaps the most obvious in cases where shadows are cast on regions which are therefore occluded from sunlight but illuminated by general skylight. This change in illumination source can cause a large change in spectral reflectance.

In order to compare the observations captured against spectral libraries, the captured data is ideally converted to reflectance data. All pixels can then be normalised using this illumination measurement.

In this embodiment, the sun, sky and indirect illumination at each pixel is estimated and accounted for during the normalization process. Furthermore, there is no requirement for a calibration panel to be placed in the scene, allowing the entire process to be automated.

Remote sensing techniques such as hyperspectral imaging provide a non-invasive method of gathering information about the surrounding environment. In mining applications, these methods are suitable for identifying and classifying mineral ores on the mine face in order to increase the efficiency of excavation. As discussed, the hyperspectral camera 1 is rotated about its axis in order to generate a three dimensional data cube of X, Y and wavelength.

Before analysis of this datacube, a luminance processing step 274 (FIG. 27) is carried out to refine the image within the datacube stored within Frame buffer store 272, prior to image analysis 273 being undertaken.

The use of LIDAR and hyperspectral sensor data for atmospheric compensation has been investigated, previous systems have sought to compensate for skylight illumination by calculating the percentage of the blue sky hemisphere visible from a specific location and using the MODTRAN atmospheric modelling algorithm to generate illumination spectra. Previous approaches failed to take into account indirect illumination.

It is desirable to determine the reflectance of any image in a natural environment as it is characteristic of the material and independent of the illumination conditions. It is further desirable to determine the reflectance in an automated manner. The embodiments provide a radiometric calibration method for the conversion of captured radiance to reflectance. These embodiment rely primarily on inverse radiosity processing measurements to determine illumination.

Figure 42:
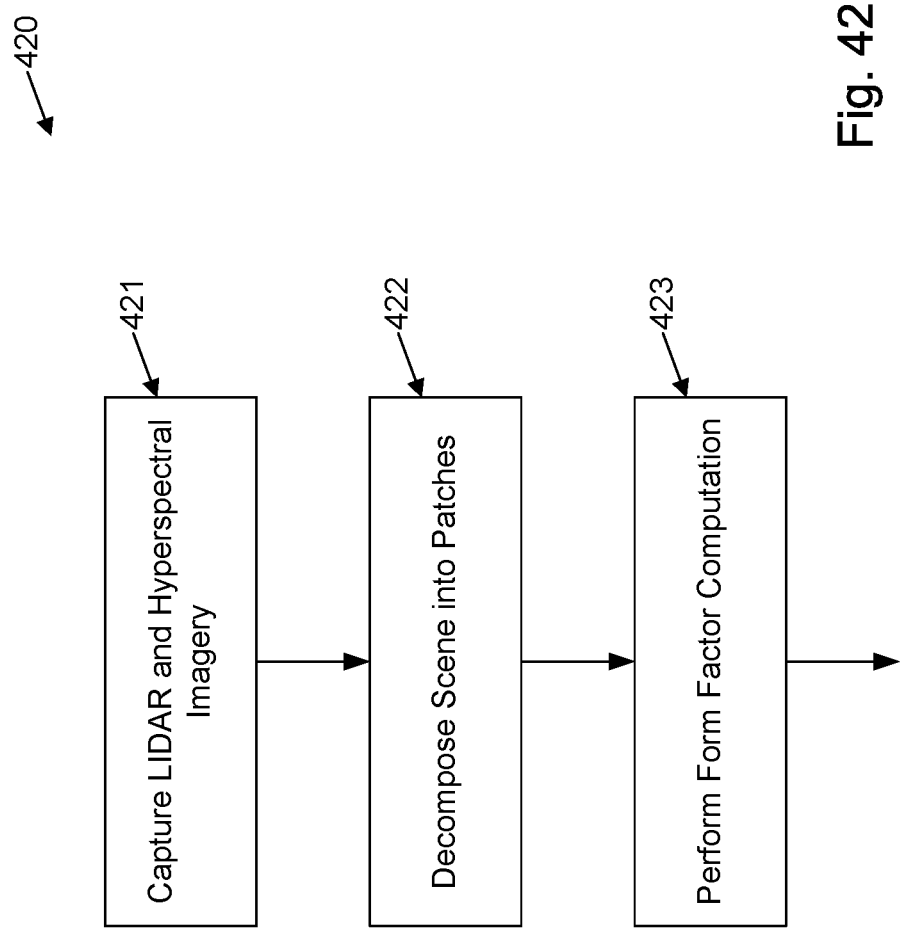
FIG. 42 illustrates a flow chart of the inverse raidiosity calculation process of an embodiment.

Turning now to FIG. 42, there is illustrated the steps in the automated reflectance calculation of the embodiment 420. An initial step involves capture of the LIDAR and Hyperspectral imagery 421. The LIDAR imagery is then used to decompose the scene into a series of patches 422. Subsequently, a Form Factor Computation 423 is performed to determine an illumination invariance measure.

Radiosity

Rendering is the process of generating an image from a specific viewpoint, given the structure, material properties and illumination conditions of the scene. While direct illumination rendering methods normally only take into account light directly from the source, global illumination methods include secondary bounces when generating images. This allows global illumination methods such as radiosity, ray tracing and photon mapping to develop increasingly realistic images.

Radiosity rendering is a method of global illumination that utilises a mesh representation of the scene and often an assumption of diffusivity to model the influence between different regions. This technique consists of four main steps and is derived from the rendering equation:

$$L(x \rightarrow \Theta) = L_e(x \rightarrow \Theta) + \int_\Omega f_r(x; \Theta \leftrightarrow \psi) L(x \leftarrow \psi) \cos(\psi, N_x) d\omega_\psi,$$

where the radiance L at location x in the direction of the camera $\Theta$, is calculated by adding the emitted radiance $L_e$ and integrating the incident radiance with the bidirectional reflectance distribution function $f_r$.

Scene Decomposition (422 of FIG. 42)

The first step in radiosity rendering is the decomposition of the scene into small patches or regions. This can be done in a number of ways including the uniform or adaptive subdivision of objects. Adaptive subdivision has the advantage in that it can be used to reduce shadowing artefacts that can arise.

Through the assumption of diffusivity for all patches in the scene, the bidirectional reflectance distribution function becomes independent of the incident and exitant light directions and can be simplified using a Lambertian shading model:

$$f_x(x(-) \leftrightarrow \Psi) = \frac{\rho(x)}{\pi}$$

where the reflectance p ranges from 0 to 1, and the division by $\pi$ is used to normalise the function. The diffuse modelling of each patch also means that exitant radiance is also independent of direction, while radiosity B(x) is proportional to radiance by a factor of $\pi$. This allows the Rendering Equation to be reduced to:

$$L(x) = L_e(x) + \rho(x) \int_\Omega \frac{L(x \leftarrow \Psi) \cos(\Psi, N_x)}{\pi} d\omega_\Psi$$

The domain of the integral is changed from being over the hemisphere, to an integral over all surfaces S in the scene.

$$L(x) = L_e(x) + \frac{\rho(x)}{A_i} \int_{S_i} \int_{S_j} \frac{L(y) \cos(\Psi, N_x) \cos(-\Psi, N_y)}{\pi r_{xy}^2} V(x, y) dA_y dA_x,$$

where V(x, y) is the binary visibility function between point x on patch i and point y on patch j.

The further assumption of homogeneous patches allows the above equation to be converted into a discretised form, where the double integral is incorporated into a value known as the Form Factor Fij:

$$L_i = L_{ei} - \rho_i \sum_{j=1}^{N} F_{ij} L_j$$

Form Factor Computation (423 of FIG. 42).

The form factor calculation between patches is an important and computationally expensive part of the radiosity rendering algorithm. In essence, the form factor describes the influence that all other patches have on each other and several methods have been devised in radiosity calculations to compute these values. These include the hemisphere and hemicube methods, area to area sampling, and local line approximation.

The local line approximation method is a simple technique to estimate the form factors. It consists of randomly choosing a point on patch i, and choosing a direction from a cosine distribution to shoot a light ray. By repeating this process N, times, form factors can be approximated by counting how many times each patch was hit $N_{ij}$:

$$F_{ij} = \frac{1}{A_i} \int_{S_i} \int_{S_j} \frac{\cos(\Psi, N_x)\cos(-\Psi, N_y)}{\pi r_{xy}^2} V(x, y) dA_y dA_x \approx \frac{N_{ij}}{N_i}$$

The radiosity formulation described above is used in the computer graphics industry to generate images given scene models and lighting conditions. An inverse radiosity process, on the other hand, utilises the image and attempts to infer either the geometry, lighting or material properties of the scene.

This is the key part of the calibration system, and is reformulated as an inverse radiosity problem that uses the image, geometry and illumination to estimate reflectance.

Practical Implementation:

In order to determine the radiance measurements of the scene, the hyperspectral camera 1 is used. This camera is a single line scanner that rotates about its axis to form the three dimensional image cube. Initial post processing corrects for any smear and dark current, before the use of radiometric calibration data is used to convert the digital numbers to radiance units.

In order to determine the scene geometry, the high resolution laser LIDAR scan of the scene is captured and processed to produce a dense point cloud. This is registered with the hyperspectral camera using a mutual information method (Taylor, Z., Nieto, J.: A Mutual Information Approach to Automatic Calibration of Camera and Lidar in Natural Environments. In: ACRA. (2012) 3-5) which generates a point cloud where each point is associated with a captured spectrum. The point cloud can then be meshed using Delaunay triangulation and the patch radiance L is calculated based on the average of the points involved.

The sky can be modelled as a hemisphere centred on the position of the laser scanner and consists of approximately 200 triangles tessellated together. The sun is explicitly modelled as a disk with angular diameter of 1 deg. Each sky patch is assumed to have no reflectance, while each non-sky patch is assumed to have an unknown reflectance and no emitted radiance.

Illumination

In this example, hyperspectral imaging was conducted in an outdoor environment and only illumination due to sunlight and skylight (indirect illumination is factored into the form factor calculation) was taken into account.

Therefore, the embodiments use a sky model developed by Hosek and Wilkie, which provides radiance estimates in the visible spectrum at each azimuth and elevation angle. The advantage of using this model based approach is that the calibration system not only contains no additional hardware, but other sky models can be easily integrated into the illumination estimation.

The IMU and GPS receiver sensors are used to localise and orientate the scene, and are also used to calculate the position of the sun. The position can be calculated according to known algorithms, for example, the algorithm developed in Reda. This gives the azimuth and zenith angle of the sun disc based on the location and time and this information is fed into the sky model to develop a sky spectra distribution.

Reflectance Estimation

In order to estimate the material properties in the scene, the above equation for form factor estimation is rearranged to solve for the reflectance:

$$\rho_i = \frac{L_i - L_{ei}}{\sum_{j=1}^{N} F_{ij} L_j}$$

This estimation is possible because the radiance measurements of the camera capture the steady state solution to the lighting problem, while the form factors account for indirect illumination sources. Estimating the form factors using a local line approach means that reflectance solutions can be produced immediately and as more light rays are generated, the solution will iterate to its final value. This reflectance estimate must be run for each wavelength A, for which calibration is taking place, though the form factor remains the same.

In one example execution of the embodiment, datasets were derived for a per-pixel calibration system from an urban environment consisting of grass, buildings and roads. Hyperspectral images were taken using a hyperspectral camera (SPECIM VNIR) that was sensitive between 400 nm and 1007 nm. The geometry data was captured using a high resolution LIDAR RIEGL laser scanner. The coregistration of the geometry and hyperspectral data was registered to form a coloured point cloud using the mutual information technique of Taylor and Nieto.

Figure 43:
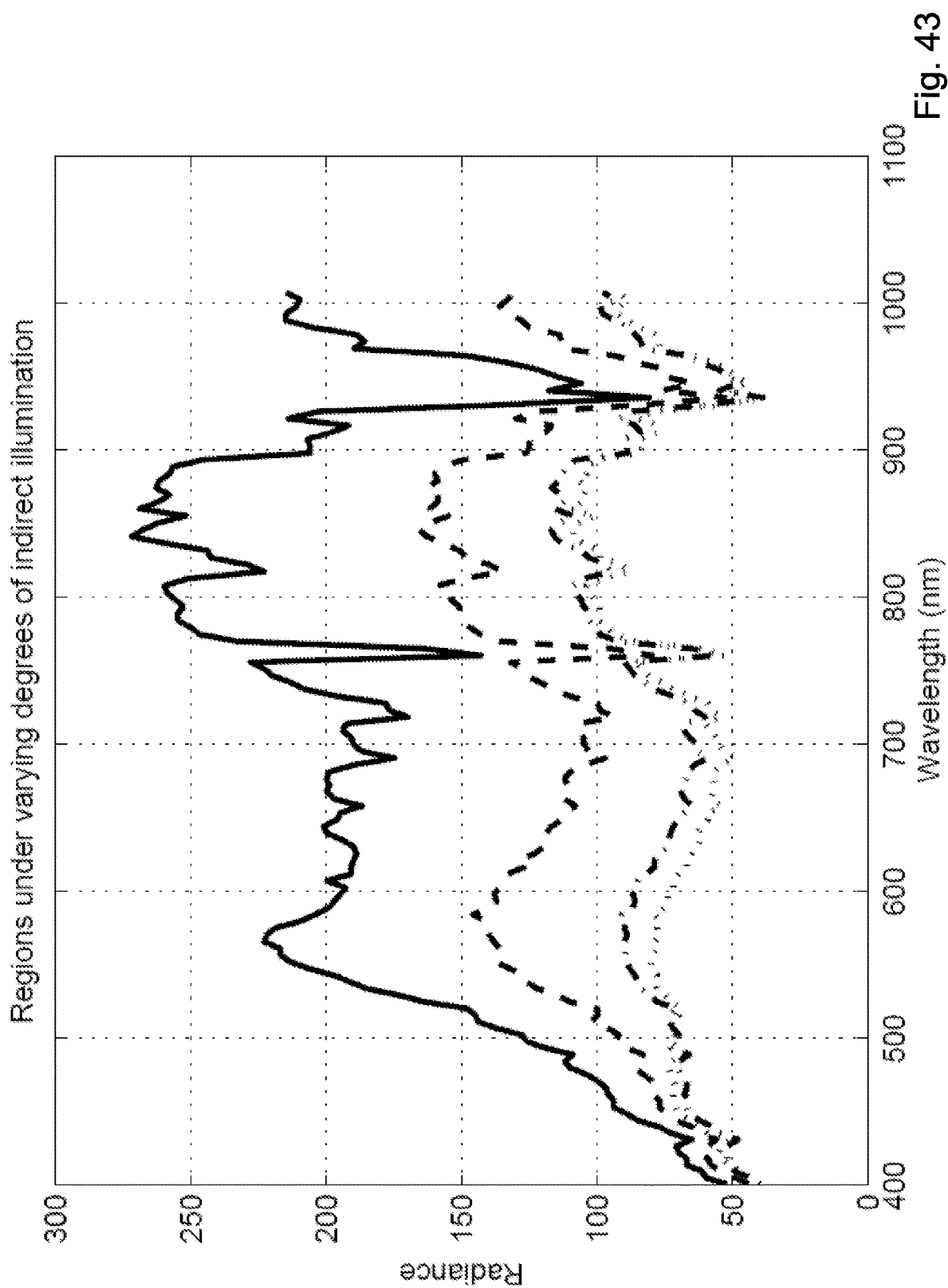
FIG. 43 illustrates an example luminance variation graph for different angled surfaces of the same object in an external environment.

In order to induce indirect illumination with known materials in the scene, coloured pieces of cardboard are placed at approximately 90° to one another. The setup consists of a high reflectance yellow cardboard being placed flat on the ground and exposed to sunlight and skylight illumination. A light grey cardboard piece is placed vertically and is also exposed to sunlight and skylight, as well as the reflected rays off the yellow piece. This causes the different regions to change colour depending on distance and angle. Example spectral signatures are shown in FIG. 43.

In summary, this embodiment provides a per-pixel calibration system for hyperspectral cameras. Prior art methods use illumination panel measurements in order to calibrate a scene, while the present embodiment method utilises the information of several common sensors in order to take into account the geometry and the different forms of illumination present in the outdoor environment. This allows for descriptors to be created which are characteristic of the material in the scene, which is important when applying high level algorithms such as image segmentation and classification.

Further refinements can include initializing the parameters of the sky model using a measurement of the downwelling radiance from the sky dome and also estimating the required integration time needed for the hyperspectral camera so that the image does not saturate and has maximum dynamic range. Whilst the above embodiment is discussed with reference to radiosity, it will be evident that other forms of inverse rendering can be utilised. For example, ray tracing, which is normally more computationally expensive, can also be utilised in an inverse rendering manner to determine surface illuminiosity.

Image Analysis

Figure 27:
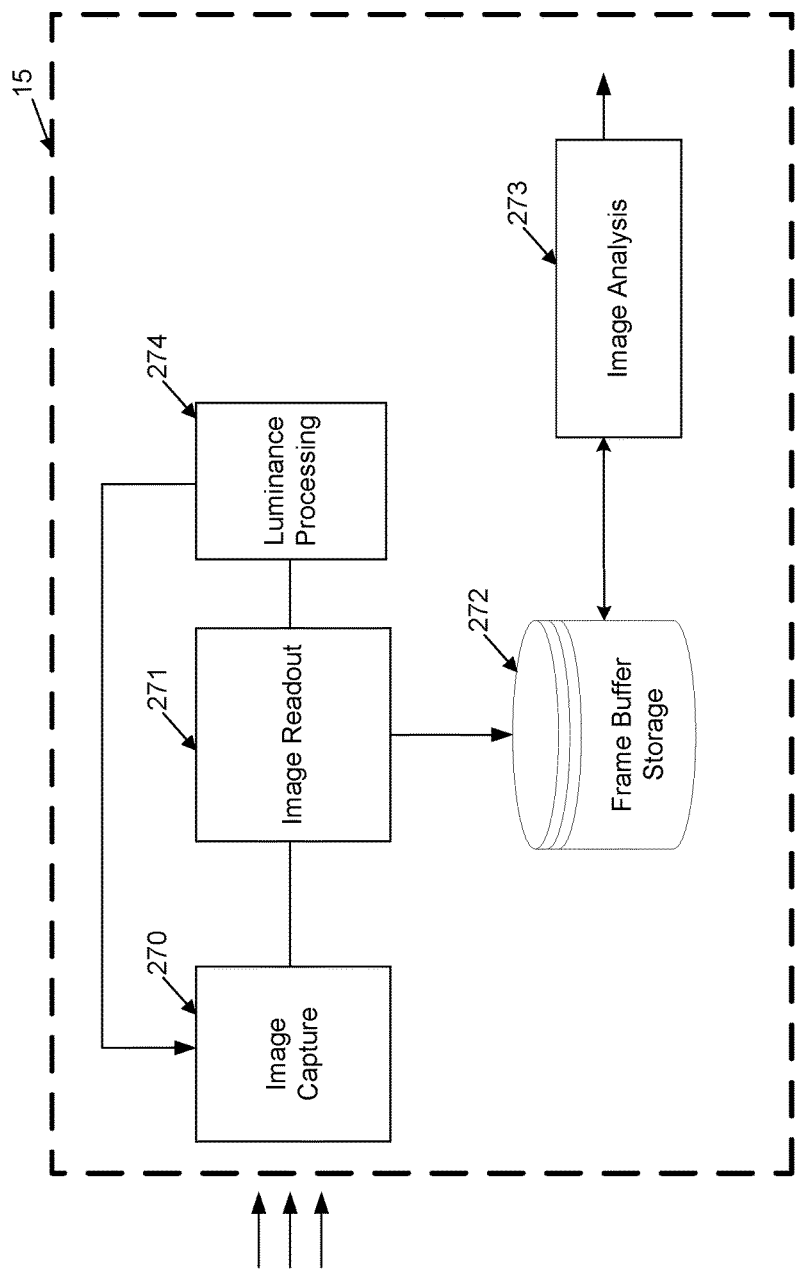
FIG. 27 illustrates schematically the image processing portions of the imager.

Turning to FIG. 27, there is illustrated the image processing unit 15 of FIG. 2 in more detail. The captured image 270 is read out 271 and subjected to the feedback loop of luminance processing as aforementioned 274. The read out image 271 is also stored in frame buffer storage 272 in the format depicted in FIG. 8. Once captured, the hyperspectral data can be analysed 273 to obtain significant quantitative information for many applications.

Many approaches to classifying or analysing hyperspectral data have been developed (e.g. Plaza et al. 2009). Many approaches to spectral analysis are based on matching the spectral curve to libraries of known minerals (e.g. Clark et al. 2003; Kruse et al. 1993). Angular metrics like the spectral angle mapper (SAM) are designed to remove variations in spectral brightness while preserving information about the shape of the spectral curve (Hecker et al. 2008). The principal problem with the approach as originally developed is that it relies upon a single spectrum to represent a 'definitive' spectral curve shape of each material or mineral that is being mapped. A threshold needs to be set, which specifies the boundary (often expressed in radians) below or above which a spectrum is respectively considered to be a match or not. In this context a SAM cannot consider variability among spectra arising from factors such as the grain size of minerals, their abundance or crystallinity (Clark and Roush 1984; Cudahy and Ramanaidou 1997).

Some works have tried to incorporate variability into analyses using SAM by matching each pixel spectrum in the image to a very large spectral library with numerous spectra representing each class (e.g. Murphy et al. 2012). Others have used machine-learning approaches where numerous spectra in each class are used to train a classifier using different kernels, including angular based metrics (e.g. SAM) at their core (e.g. Schneider et al. in press). Any classifier can operate within one of two paradigms—a one-versus-all approach or a multiclass approach. The former considers only the class of interest and considered all other classes to another class. The limitations to this approach are that the classifier has to be run numerous times, considering each class in turn. This approach cannot consider the relationships between the different classes as a coherent ensemble of classes that constitute the data. Multiclass approaches represent a more comprehensive way of classifying the data in a single unified step. Relationships between the different classes are considered when assigning the optimal class to each pixel spectrum.

In a first embodiment, a multivariate nonstationary covariance function is utilised which works efficiently in very high dimensional spaces and is invariant to the varying conditions of illumination. No stationary covariance function was used for this modelling task because it is not, except in trivial cases of a constant covariance function, invariant to conditions of illumination. The nonstationary covariance function is tested within a fully autonomous multi-class framework based on Gaussian Processes (GPs). This approach to classification is termed a multi-task Gaussian processes (MTGP).

Initially, in order to determine the parameters of the MTGP process, the system was first trained. The MTGP was applied to hyperspectral imagery (1000 to 2500 nm) of rock samples of example environments that was acquired in the laboratory. To do this, high-resolution reflectance spectra acquired by a field spectrometer were used to train the MTGP. Many studies using machine learning methods use data from the same sensor for training and classification often with cross validation (Jiang et al. 2007; Kohram and Sap 2008). To provide a more rigorous test of MTGP, data acquired from different sensors was used for these two discretely different stages of classification. The use of data acquired in the laboratory enabled labels to be attached to the images of rock samples with a great degree of certainty. Because data were acquired with artificial light without the effects of scattering and absorption imposed by an intervening atmosphere, these data represent the best opportunity for a MTGP process to succeed. The MTGP was tested using data from the entire spectral curve and on a spectral subset of data where bands, which are known to be affected by atmospheric effects, have been removed.

Secondly, the MTGP is used to classify hyperspectral imagery acquired from the field-based platform from a vertical rock wall. To do this spectra acquired under artificial light in the laboratory was used to classify imagery acquired under natural sunlight. This presents a more difficult task than classifying data acquired in the laboratory. The complex geometry and multifaceted nature of the rock face across a multiplicity of spatial scales caused large variations in the amount of incident and reflected light. Consequently, many sections of the rock wall may be shaded from the direct solar beam and are therefore in shadow. This complex interplay between the geometry of the mine wall and the geometry of illumination causes large changes in reflectance, which were independent of mineralogy. Furthermore, absorption by atmospheric water vapour and gasses prevented some sections of the spectrum from being used in the classification. Other sections of the spectrum where atmospheric absorption was present but to a smaller degree are often noisy. These effects make classification of a mine wall an altogether more difficult task for the MTGP classifier than classification of the laboratory data. Results from classification of the laboratory and field imagery were compared directly with those obtained using a classical SAM classifier.

Mathematical Framework of the Gaussian Process—The Multi-task Gaussian Processes Consider the supervised learning problem of estimating M tasks y* for a query point x* given a set X of inputs $x_{11}, \ldots, x_{N_1 1}, x_{12}, \ldots, x_{N_2 2}, \ldots, x_{1M}, \ldots, X_{N_M M}$ and corresponding noisy outputs $y=(y_{11}, \ldots, y_{N_1 1}, y_{12}, \ldots, y_{N_2 2}, \ldots, Y_{1M}, \ldots, y_{N_M M})^T$, where $x_{i1}$ and $y_{i1}$ correspond to the i-th input and output for task l respectively, and $N_l$ is the number of training examples for task l. The GPs approach to this problem is to place a Gaussian prior over the latent functions $f_l$ mapping inputs to outputs. Assuming zero mean for the outputs, consider a covariance matrix over all latent functions in order to explore the dependencies between different tasks $$\text{cov}[f_l(x), f_k(x')] = (x, x'), \qquad (1)$$

where $K_{lk}$ with l, k=1: M define the positive semi-definite (PSD) block matrix K.

Inference in the multi-task GPs can be computed using the following equations for the predictive mean and variance $$\bar{f}_l(x^*) = k_l^T K_y^{-1} y, V[f_l(x^*)] = k_{ll} - k_l^T K_y^{-1} k_l \quad (2)$$

where $K_y = K + \sigma^2 I$ is the covariance matrix for the targets y and $k_l = [k_{1l}(x^*, x_{11}) \ldots k_{1l}(x^*, x_{N_1 1}) \ldots k_{Ml}(x^*, x_{1M}) \ldots k_{Ml}(x^*, x_{N_M M})]^T$.

Learning can be performed by maximising the log marginal likelihood:

$$L(\Theta) = -\frac{1}{2} y^T K_y^{-1} y - \frac{1}{2} \log|K_y| - \frac{\log 2\pi}{2} \sum_{i=1}^{M} N \quad (3)$$

where $\Theta$ is a set of hyper-parameters.

Inference in the multi-task GPs can be computed using the following equations for the predictive mean and variance $$\bar{f}_l(x^*) = k_l^T K_y^{-1} y, V[f_l(x^*)] = k_{ll} - k_l^T K_y^{-1} k_l. \quad (4)$$

where $K_y = K + \sigma^2 I$ is the covariance matrix for the targets y and $$k_l = [k_{1l}(x^*, x_{11}) \ldots k_{1l}(x^*, x_{N_1 1}) \ldots k_{Ml}(x^*, x_{1M}) \ldots k_{Ml}(x^*, x_{N_M M})]^T$$

Similarly, learning can be performed by maximising the log marginal likelihood $$L(\Theta) = -\frac{1}{2} y^T K_y^{-1} y - \frac{1}{2} \log|K_y| - \frac{\log 2\pi}{2} \sum_{i=1}^{M} N \quad (5)$$

where $\Theta$ is a set of hyper-parameters.

Illumination Invariance and Non-Stationary

Most of the popular covariance functions (Spherical, Gaussian, Cubic, Exponential, etc.) used in geological modelling are stationary. These functions have proved to be very effective in modelling spatial phenomena. However, due to the illumination invariance property required for modelling of hyperspectral data, a non-stationary covariance function has to be employed as constant stationary covariance functions do not perform the function of lumination invariance.

A non-constant stationary covariance functions cannot be illumination invariant. For if a covariance function $K(x,x')$ is both stationary and illumination invariant, the following conditions hold:

Stationarity: $K(x,x') = K(x+h, x'+h), \forall h \in R^D$ \quad (6)

Illumination invariance: $K(ax, a'x') = K(x,x'), \forall a, a' \in R.$ \quad (7)

Figure 28:
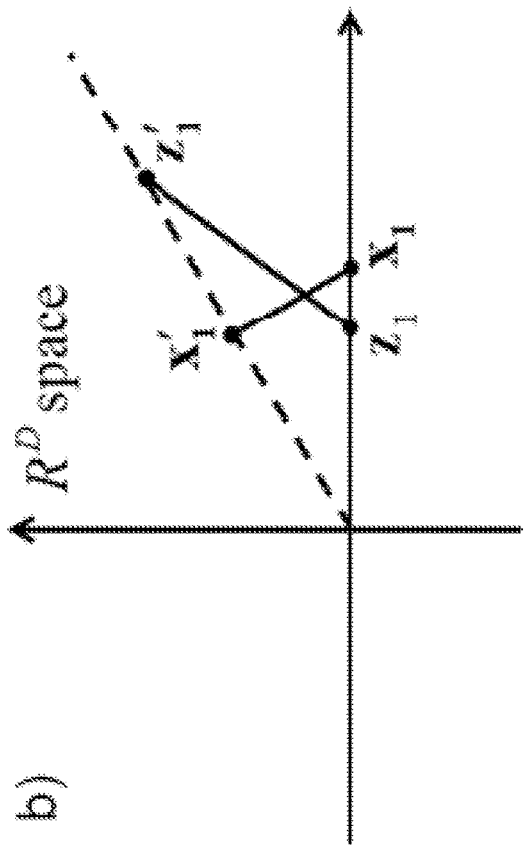
FIG. 28 and FIG. 29 illustrate graphs in $R^D$ space and illustrate the stationary covariance functions, which cannot be illumination invariant.
Figure 29:
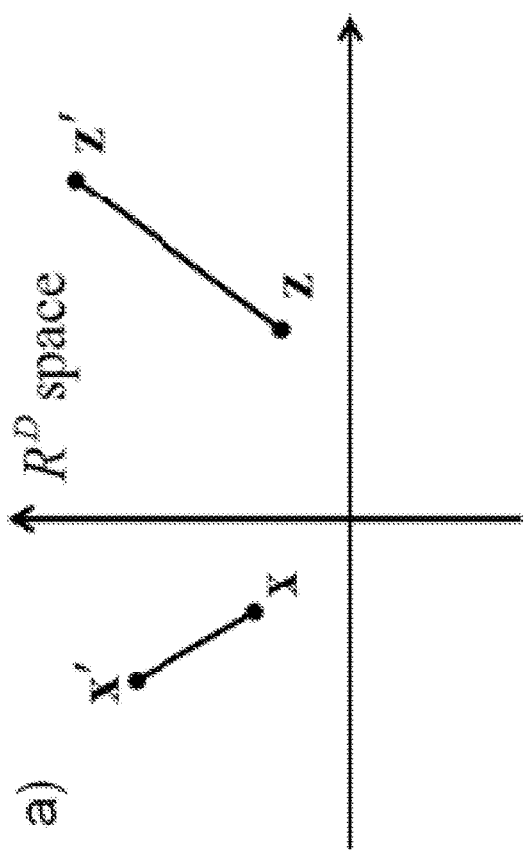

Consider four arbitrary points $x, x', z, z' \in R^D$ as shown in FIG. 28. By conducting parallel translation of the vectors $\overline{xx'}$ and $\overline{zz'}$ they can be positioned in such a way that the starting points of these vectors as well as their end points lay on the same ray coming out from the centre of coordinates as demonstrated in FIG. 29. From the stationary condition it follows that $K(x,x') = K(x_1, x_1')$ and $K(z,z') = K(z_1, z_1')$. As $x_1 = z_1 |x_1|/|z_1|$ and $x_1' = z_1' = z_1' |x_1'|/|z_1'|$, from the illumination invariance condition follows and that $$K(x_1, x_1') = K\left(\frac{|x_1|}{|z_1|} z_1, \frac{|x_1'|}{|z_1'|} z_1'\right) = K(az_1, a' z_1') = K(z_1, z_1').$$

Combination of these two results leads to $K(x,x') = K(x_1, x_1') = K(z_1, z_1') = K(z, z')$ which means that the covariance function has the same value of arbitrary pairs of points and therefore it is constant.

A Single-Task OAD Covariance Function

A single-task observation angle dependent (OAD) covariance function and the proof of its positive semi-definiteness is presented by Melkumyan and Nettleton (Melkumyan and Nettleton 2009). The single-task OAD covariance function has the following form:

$$K(x, x'; x_c, \varphi, \Omega) = \sigma_0 \left(1 - \frac{1 - \sin\varphi}{\pi} \arccos \frac{(x - x_c)^T \Omega(x' - x_c)}{\sqrt{(x - x_c)^T \Omega(x - x_c)} \sqrt{(x' - x_c)^T \Omega(x' - x_c)}}\right) \quad (8)$$

where $\Omega = A^T A$ is a symmetric positive semi-definite (PSD) matrix, A is the non-singular linear transformation matrix, x, x' and $x_c$ are D dimensional vectors. When $\Omega$ is a unit matrix, the OAD covariance function depends only on the angle at which the points x and x' are observed from an observation centre $x_c$. When $\Omega$ is not a unit matrix, the OAD covariance function can be considered to depend on a pseudo-angle between the points x and x'.

This covariance function has the following hyper-parameters: $\sigma_0$ and $\varphi$ scalars, D dimensional vector $x_c$ and D×D symmetric positive semi-definite matrix $\Omega$. The resulting total number of scalar hyper-parameters is equal to 2+D(D+3)/2. As the angle between the vectors x and x' depends not on the difference x−x' but on the spatial locations of x and x', the OAD covariance function Eq. 8 is non-stationary.

The OAD covariance function Eq. 8 is based on the following transfer function:

$$\tilde{h}(x, u; x_c) = \sigma_0 \begin{cases} a_0, & \text{if } \alpha(x, u; x_c) < \pi/2 \\ b_0, & \text{if } \alpha(x, u; x_c) > \pi/2 \end{cases} \quad (9)$$

where $\alpha(x, u; x_c)$ represents the pseudo-angle between D dimensional points x and u as observed from the D dimensional centre $x_c$.

Multi-Task OAD Covariance Function

A multi-task OAD covariance function can be constructed. Although Melkumyan and Ramos (2011) discloses a multi-task OAD, this has not been extended to non-stationary functions. The present embodiment extends the OAD to the case of non-stationary covariance functions:

if h(x, u) is a transfer function and $k_{ii}(x, x')$, i=1:M are single-task non-stationary covariance functions which can be written in the following form:

$$k_{ii}(x, x') = \int_{R^D} h_i(x, u) h_i(x', u) du, \, i = 1:M \quad (10)$$

then the M task covariance function defined as $$K(x_i, x_j') = \int_{R^D} h_i(x_i, u) h_j(x_j', u) du \quad (11)$$

where $x_i$ and $x_j'$ belong to the tasks i and j, respectively, is a positive semi-definite (PSD) multi-task non-stationary covariance function.

Using this proposition, when the covariance functions $k_{ii}(x,x)$ can be written as in Eq. 10 the cross covariance terms can be calculated as in Eq. 11. The main challenge in construction of a multi-task OAD covariance function is now reduced to finding $h_i(x, u)$ transfer functions and computing the integrals in Eq. 11. The single-task OAD covariance function Eq. 8 can be obtained by conducting integration through the circumference of the unit sphere with the centre $x_c$. To construct multi-task OAD covariance function analytical integration will be needed to be conducted through the entire D dimensional space $R^D$.

Initially, it is possible to set the origin of the coordinate system at x, and define a transfer function:

$$h(x,u;0) = \tilde{h}(x,u;0)\exp(-u^T C u) \quad (12)$$

where $\tilde{h}(x,u; 0)$ is as defined in Eq. 9. A key difference between $\tilde{h}(x, u; 0)$ in Eq. 9 and $h(x,u;0)$ in Eq. 12 is that $h(x,u;0)$ rapidly tends to zero when $u \to \infty$ which makes it integrable in the entire space $R^D$.

Combining Eq. 9 and Eq. 12 leads to the following transfer function for i-th task $$h_i(x, u:0) = \sigma_0 \exp(-u^T C_i u) \begin{cases} a_i, & \text{if } \alpha(x, u; 0) < \pi/2 \\ b_i, & \text{if } \alpha(x, u; 0) > \pi/2 \end{cases}, \quad (13)$$

The auto-covariance terms of the M task covariance function can be defined as:

$$(x,x') = \sigma_{0i}^2 \int_{R^D} h_i(x,u;0) h_i(x',u;0) du, \quad (14)$$

and the cross covariance terms as $$k_{ij}(x_i,x_j) = \sigma_{0i}\sigma_{0j} \int_{R^D} h_i(x_i,u;0) h_j(x_j,u;0) du. \quad (15)$$

Due to the proposition discussed above, this is a PSD multi-task covariance function. The Eqs. 14 and 15 can be analytically calculated resulting in the following expressions where $x_c$ is introduced via a shift of the coordinate system $$k_{ii}(x_i, x_i'; \varphi_i, C_i) = \sigma_i^2 \left( 1 - \frac{1-\sin\varphi_i}{\pi} \arccos \frac{(x-x_c)^T C_i^{-1}(x_i'-x_c)}{\sqrt{(x-x_c)^T C_i^{-1}(x-x_c)} \sqrt{(x'-x_c)^T C_i^{-1}(x'-x_c)}} \right) \quad (16)$$

$$k_{ii}(x_i, x_j; \varphi_i, \varphi_j, C_i, C_j) = \sigma_i \sigma_j 2^{\frac{D}{2}} \frac{|C_i|^{\frac{1}{4}}|C_j|^{\frac{1}{4}}}{|C_i + C_j|^{\frac{1}{2}}} \quad (17)$$

$$\left( \cos\left(\frac{\varphi_i - \varphi_j}{2}\right) - \frac{\cos\left(\frac{\varphi_i - \varphi_j}{2}\right) - \sin\left(\frac{\varphi_i + \varphi_j}{2}\right)}{\pi} \times \times \arccos \frac{(x_i - x_c)^T (C_i + C_j)^{-1}(x_j - x_c)}{\sqrt{(x_i - x_c)^T (C_i + C_j)^{-1}(x_i - x_c)} \sqrt{(x_j - x_c)^T (C_i + C_j)^{-1}(x_j - x_c)}} \right),$$

$$k_{ij}(x_i, x_j; \varphi_i, \varphi_j, C_i, C_j) = k_{ji}(x_j, x_i; \varphi_i, \varphi_j, C_i, C_j) \text{ where}$$

$$\sigma_i = \sigma_{0i} 2^{-\frac{D-1}{2}} \left(\frac{\pi}{2}\right)^{\frac{D}{4}} |C_i|^{-\frac{1}{4}};$$

$$\cos\frac{\varphi_i}{2} = a_i; \sin\frac{\varphi_i}{2} = b_i; i, j = 1:M$$

and M is a number of tasks. |C| in Eq. 17 denotes the determinant of the matrix C.

In the special case of $C_i = C_j$, $\varphi_i = \varphi_j$ the multi-task OAD covariance function recovers the single task OAD covariance function Eq. 8.

Experimental Study

The above covariance function was utilised in a field study. The study area was a vertical mine face in an open pit mine in the Pilbara, Western Australia. The geology of the area is comprised of late Archaean and early Proterozoic Banded Iron Formation (BIF) and clay shales (Morris 1980; Morris and Kneeshaw 2011). Whaleback shale is a thick sedimentary unit comprising hematite, goethite, maghemite and silica. Black shales rich in vermiculite were also present. The rock (mine) face used in this study is dominated by clay shales (Shales 1 to 4) and Whaleback shale (Shale 5; Table 1).

Table 1 below shows rock samples used to classify hyperspectral imagery in the laboratory (Experiment 1) and in the field (Experiment 2).

TABLE 1

| Classes | Description | Dominant mineralogy | Experiment |
| --- | --- | --- | --- |
| Shale 1 | Clay shale, friable, grey to red in colour | Kaolinite, hematite, nontronite | 1 + 2 |
| Shale 2 | Clay shale, friable, cream, red-orange in colour | Goethite, kaolinite, hematite | 2 |
| Shale 3 | Clay shale, hard, green-orange in colour | Goethite, nontronite, kaolinite | 1 + 2 |
| Shale 4 | Clay shale, soft, white in colour, chalky appearance | Kaolinite | 1 + 2 |
| Shale 5 | Whaleback shale, hard, red-orange in colour | Hematite, goethite | 2 |
| Ore (hematite) | Ore, hard to soft, grey-blue-red in colour | Hematite | 1 |
| Ore (goethite) | Ore, hard to soft, deep orange-yellow in colour | Goethite | 1 |

Figure 30:
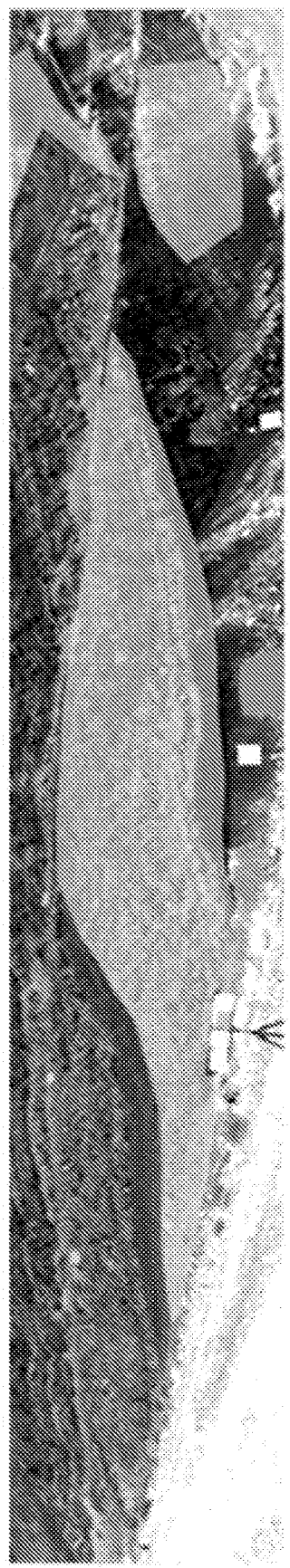
FIG. 30 illustrates a generalised map of the distribution of the major, spectrally distinct, shale units on the rock face as mapped from field observation.

Constructing a map of the rock units comprising the mine wall was difficult. It was only possible to spend a small amount of time in close proximity to the mine's rock face because of the risk from falling rocks. A geologist with a detailed working knowledge of the mine pit provided information on the identity of the different rock units on the mine wall. Using this information, together with direct observations, a detailed map was made of the different geological units on the rock wall. The map is illustrated in FIG. 30.

Rock samples: In order to test the operational characteristics of the above method, two experiments were conducted and rock samples were collected from a mine. For the first experiment, rocks were selected which were the dominant rock types in the mine. Selection of individual samples was done based on their physical characteristics including their hardness and colour. For the second experiment, a separate set of samples were acquired from the different geological units which characterised the rock wall after hyperspectral imagery was acquired. Each set of samples was composed of between 2 and 5 replicate samples, and were acquired from the geological units identified in the field. Spectra extracted from laboratory hyperspectral imagery of these samples were used to train the MTGP and SAM.

Confirmation of the identity of the dominant minerals in the rock was made by quantitative X-ray diffraction (XRD) analysis (Table 1). Samples were ring-milled with an internal standard and micronised. XRD patterns were measured using a Bruker-AXS D8 Advance Diffractometer with cobalt radiation. Crystalline phases were identified by using a search/match algorithm (DIFFRAC.EVA 2.1; Bruker-AXS, Germany). Relevant crystal structures extracted for refinement were obtained from the Inorganic Crystal Structure Database (ICSD 2012/1). The crystalline phases were determined on an absolute scale using Rietveld quantitative phase refinement, using the Bruker-AXS TOPAS v4.2 software package.

The MTGP method was applied to hyperspectral imagery acquired in the laboratory and in the field.

Laboratory imagery (Experiment 1): Laboratory imagery enabled the MTGP to be tested on rock samples of known mineralogy under controlled conditions (Experiment 1). Imagery was acquired under a stable artificial light source without the effects of atmospheric scattering and absorption. Samples were illuminated so that no parts of the samples were shaded. Thus, the laboratory imagery provided the best possible quality image data to test the MTGP method. Five different rock types collected from the local area were selected (Table 1). The samples of shale (Shales 1, 3 & 4) were homogeneous samples i.e. uniform in texture, colour and hardness. The samples of ore were composed of discrete layers of hematite or goethite.

Figures 31, 32:
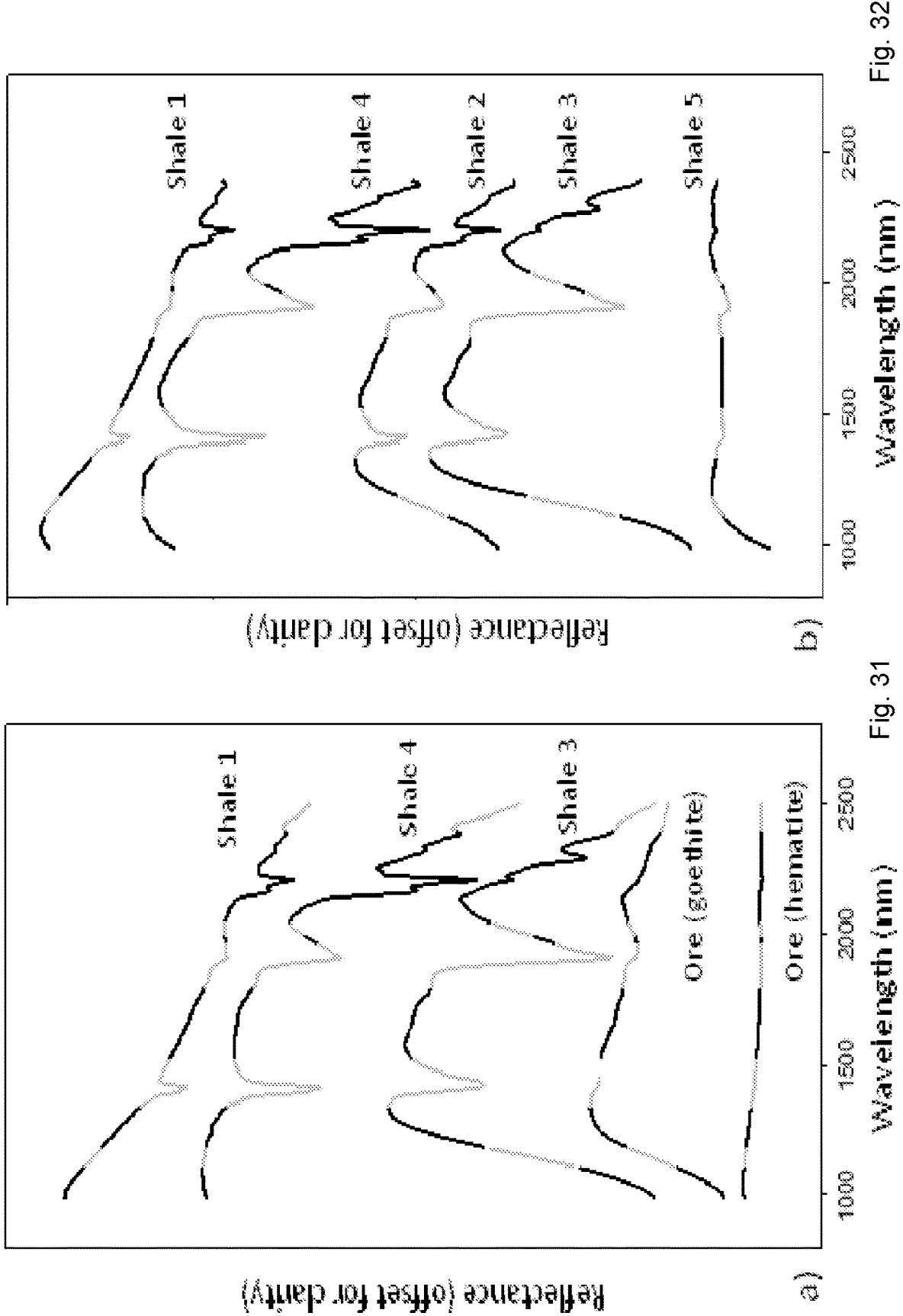
FIG. 31 illustrates a graph of spectra used to train MTGP and SAM to classify Laboratory imagery. Wavelengths in the contiguous dataset which are affected by atmospheric effects and which had been removed in the reduced dataset are shown in grey. Spectra are offset on the vertical axis for sake of clarity. The spectra are averages of 6 spectra acquired from high-resolution field spectrometer.
FIG. 32 illustrates a graph of spectra used to train MTGP and SAM to classify field imagery. Wavelengths in the contiguous dataset which are affected by atmospheric effects and which had been removed in the reduced dataset are shown in grey. Spectra are offset on the vertical axis for sake of clarity. The spectra are averages from a hyperspectral image acquired in the laboratory of rock samples (n=400).

The MTGP was trained using spectra acquired from the samples using a field spectrometer (FIG. 31). These data were used to classify the hyperspectral imagery of the rock samples. Two analyses were done. The first used data for all wavelengths within spectral range detected by the sensor (989 to 2496 nm; 'contiguous dataset'). The second used only bands that were not affected by atmospheric absorption or excessive noise towards longer wavelengths (Table 2; 'reduced dataset'). If there were large differences in classification performance these analyses this would indicate that important, spectrally-discriminating information would inevitably be lost as a consequence of acquiring data in the field using natural light. Classifications made by MTGP were compared with those obtained from SAM.

TABLE 2

Wavelength ranges used for the spectral subset used in both experiments.

| Start wavelength (nm) | End wavelength (nm) | Reason for omitting data |
|---|---|---|
| 989 | 1103 | Avoids water absorption at ~1135 nm |
| 1185 | 1330 | |
| 1525 | 1787 | Avoids water absorption at ~1400 nm |
| 1967 | 1992 | Avoids water absorption at ~1900 nm |
| 2041 | 2392 | Avoids water absorption at >2392 nm |

Wavelength ranges used tor the spectral subset used in both experiments.

Field imagery (Experiment 2): The MTGP method was applied to imagery acquired in the field from a vertical rock face (Experiment 2). This presented a more difficult test for MTGP for several reasons. Imagery acquired under natural sunlight is affected by absorption by atmospheric gasses and water vapour, which make certain parts of the spectrum unusable (e.g. spectral regions near 1400 and 1900 nm). In other parts of the spectrum these effects reduce the amount of incident light decreasing the signal-to-noise ratio of the data. Furthermore, it is not always possible to remove residual atmospheric absorption from the data, which can result in changes to the shape of the spectral curve that is unrelated to mineralogy. Rock faces commonly have complex surface geometries with overhanging rock obscuring the direct solar beam. This causes parts of the rock faces to become shaded over different spatial scales. The multifaceted rock face causes large variability in incident and reflected light causing variability in the magnitude and shape of the spectral curve, which are unrelated to variability in mineralogy.

Spectral from hyperspectral imagery of rock samples acquired under artificial light was used to train the MTGP. FIG. 32 illustrates an example of such spectra. The same spectral subset was used to train the MTGP to classify imagery of the rock face as was used to classify the laboratory image (reduced dataset). Results were compared with those obtained from SAM.

High-resolution spectroscopy: For Experiment 1, reflectance spectra from a high-resolution field spectrometer (FieldSpec 3, Analytical Spectral Devices, Boulder Colo., USA) were used to train MTGP. The spectrometer measured reflected light between 350 to 3500 nm. It was fitted with a reflectance probe that contained an integrated halogen lightsource. The measuring window of the probe was 2 cm in diameter, corresponding to an area of 3.14 $cm^2$ on the sample surface. A spectrum from a reflectance standard (~99% Spectralon) was acquired immediately prior to each spectrum of the rock surface. Both the calibration and rock spectra were acquired by placing the probe into direct contact with the surface being measured. Six spectra were acquired from each rock type (30 spectra in total). All data were calibrated to reflectance by dividing each rock spectrum by the corresponding spectrum from the reflectance standard and multiplying by the reflectance factor of the panel. Data were then convolved to the wavelengths sensed by the imaging sensor using a Gaussian curve to represent a bandwidth sensitivity function.

Hyperspectral imagery: Hyperspectral imagery was acquired from rock samples in the laboratory using artificial illumination and from the vertical rock face using natural sunlight. Hyperspectral imagery was acquired over the entire shortwave infrared spectral region (SWIR; 970 to 2500 nm) using a line scanning imager (Specim, Oulu, Finland). The data have a nominal full width half maximum (FWHM) spectral resolution of 6 nm, giving 244 spectral bands. Data were encoded at 14 bits. The same sensor was used to acquire imagery in the laboratory and in the field.

For the laboratory imagery, the sensor was mounted on a metal scanning frame, point nadir onto a scanning table. The samples were placed on the table, which moved beneath the sensors to build up the second (along-track) spatial dimension of the image. The samples were illuminated using two arrays of 7 halogen lights each. A calibration image was taken from a reflectance standard (~99% Spectralon; Labsphere, North Sutton, N.H., USA) immediately prior to the image of the rock samples (target image).

To acquire imagery of the rock face in the field, the line scanner was mounted inside the hyperspectral imager 1 of FIG. 1.

The line scanner was mounted on a rotating platform on the top of a tripod. To isolate the scanner from high (>50° C.) temperatures and windblown dust, the sensor was enclosed in an insulated box. Cool desiccated air was passed over the sensors during their operation.

In the field, a reflectance standard (~80% Teflon) was placed in the field-of-view of the scanner. Teflon was used instead of Spectralon for calibration because it was more robust for use in the dusty mine environment.

Images were acquired by rotating the scanner to build up the along-track spatial dimension. Sensor integration time was set so that no pixels of interest were saturated, i.e. their value attained the bit-depth of the sensor.

The laboratory and field imagery were corrected for the effects of the dark current of the sensor by subtracting a separate dark current measurement from all images. Laboratory imagery was calibrated to reflectance by dividing the pixels in each band in the target image by those in the corresponding band in the calibration image. Absolute reflectance was obtained by multiplying this quotient by the calibration factor of the panel. This was done on a line-by-line basis to compensate for variability in across-track illumination of the samples. Field imagery was calibrated to reflectance in the same way but on a band-by-band basis using the average pixel values over the reflectance standard.

Validation: The classifications from MTGP and SAM for Experiments 1 and 2 were validated in different ways. For Experiment 1 the classification was validated using standard statistics which describe how well classifications correspond to ground truth. These included the kappa coefficient of agreement (Congalton et al. 1983; Hudson and Ramm 1987) and statistics describing errors of commission and omission (Mather 2004). The mineralogy of the rocks was known from quantitative XRD analyses. Ground-truth information was obtained by identifying areas of the rocks that were homogeneous prior to classification. This was done by close inspection of the rocks using a magnifying glass to identify areas of the rock surface that were representative of the rock type describing each class based on its colour, grain size and hardness. Thus, ground truth was defined by specifying regions of interest (ROI) on the surface of the rock samples for each of the 5 classes. The classifications made from the contiguous and reduced datasets were compared using the above statistics. The total numbers of pixels classified as each rock type was calculated separately from the classifications made from the contiguous and reduced datasets. The percentage change in the number of pixels classified as the same class between these datasets was then determined. The percentage change in the number of pixels classified as the same class by MTGP and SAM from the contiguous and reduced was calculated for each class. For experiment 2, validation was done by comparing the maps made by MTGP and SAM to the general distribution of the geological units as they were mapped in the field.

Results

Figure 33:
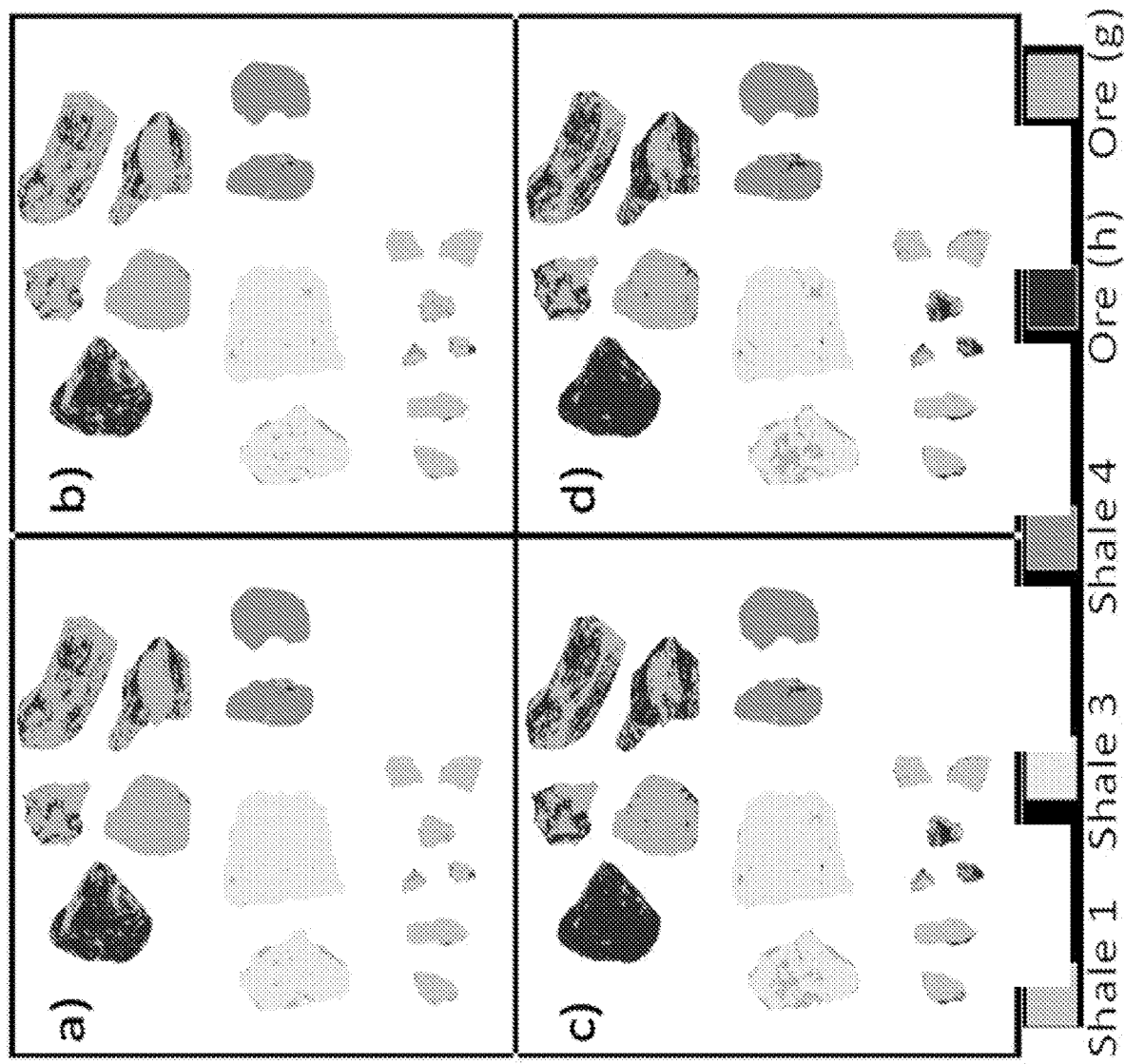
FIG. 33 illustrates classified maps made by MTGP and SAM from laboratory imagery: (a) MTGP using the contiguous dataset; (b) MTGP using the reduced dataset; (c) SAM using the contiguous dataset; and (d) SAM using the reduced dataset.

Experiment 1: Classifications made by MTGP and SAM using the contiguous dataset were qualitatively very similar but with some small differences. (FIG. 33). Results were largely consistent with the known mineralogy of the rocks. The classifications made using data from the contiguous dataset were very similar to those made from the reduced dataset (cf. FIG. 33a & b; c & d). The consistency in the total numbers of pixels classified by MTGP and SAM as the same class from, respectively, the contiguous and reduced datasets were inconsistent among classes. Table 3 illustrates the percentage change in the numbers of pixels classified as the same class in classifications made by MTGP and SAM from the contiguous and reduced datasets.

TABLE 3

| | Percent change in pixels | |
|---|---|---|
| Classes | MTGP | SAM |
| Shale 1 | 0.48 | 4.27 |
| Shale 3 | 1.17 | 3.26 |
| Shale 4 | 0.05 | 1.04 |

TABLE 3-continued

| | Percent change in pixels | |
|---|---|---|
| Classes | MTGP | SAM |
| Ore (hematite) | 11.67 | 5.5 |
| Ore (goethite) | 5.8 | 7.99 |
| Average | 3.834 | 4.412 |

The largest (11.67%) and smallest (0.05%) changes occurred in the MTGP classification of Ore (hematite) and Shale 4, respectively. The average percentage change in the numbers of pixels classified as the same class from the contiguous and reduced datasets was smaller for MTGP than the SAM classification. The number of pixels classified as a particular class was therefore more consistent between the contiguous and reduced datasets for classifications made by MTGP than for SAM.

The overall accuracy and kappa coefficient showed that MTGP outperformed SAM. Table 4 below shows the statistical measures of classification performance of MTGP and SAM applied to the contiguous and reduced datasets from the laboratory imagery, initially showing the overall accuracy and Kappa coefficient of agreement.

TABLE 4

| | Overall accuracy (%) | Kappa |
|---|---|---|
| MTGP (contiguous) | 0.98 | 0.97 |
| MTGP (reduced) | 0.96 | 0.95 |
| SAM (contiguous) | 0.93 | 0.91 |
| SAM (reduced) | 0.91 | 0.88 |

This was true for classifications made from both datasets. Classifications made by MTGP and SAM from the reduced dataset resulted in a loss of overall accuracy of 5% compared to classifications made from the contiguous dataset. This suggests that removal of bands from the imagery acquired in the field to avoid atmospheric effects would have only a small impact on the overall performance of MTGP and SAM, at least for the classes considered here.

Table 5 below shows statistics describing error of commission and omission for each class showed large difference between the classifications made by MTGP and SAM.

TABLE 5

| | MTGP (contiguous) | | MTGP (reduced) | |
|---|---|---|---|---|
| Class | Commission (%) | Omission (%) | Commission (%) | Omission (%) |
| Shale 1 | 0.83 | 2.64 | 1.58 | 3.33 |
| Shale 3 | 0 | 1.21 | 0.02 | 2.89 |
| Shale 4 | 1.47 | 2.88 | 1.65 | 3.27 |
| Ore (hematite) | 2.55 | 11.34 | 3.4 | 15.28 |
| Ore (goethite) | 10.7 | 0.04 | 15.95 | 0.06 |

| | SAM (contiguous) | | SAM (reduced) | |
|---|---|---|---|---|
| Class | Commission (%) | Omission (%) | Commission (%) | Omission (%) |
| Shale 1 | 0.02 | 20.61 | 0.03 | 22.96 |
| Shale 3 | 0 | 6.36 | 0.27 | 10.59 |
| Shale 4 | 7.74 | 3.38 | 8.71 | 3.9 |
| Ore (hematite) | 16.33 | 4.16 | 18.12 | 5.39 |
| Ore (goethite) | 18.66 | 1.03 | 26.54 | 1.54 |

The largest errors for MTGP were found for Ore (hematite) and Ore (goethite) classes. About 11% of pixels, which should have been classified as hematite, were not correctly classified as that class, as indicated by the large error of omission. Conversely, about 10% of pixels, which should not have been classified as goethite, were classified as that class, as indicated by the large error of commission. Errors were marginally larger for the MTGP when applied to the reduced-compared to the contiguous dataset. Different patterns of errors were found for the classifications made by SAM from the contiguous dataset. Errors of commission were similarly large for both hematite and goethite. Errors of omission were much large for Shale 1 than they were in the MTGP classification. Similar, patterns of error were found for SAM when it was applied to the reduced dataset.

Figure 34:
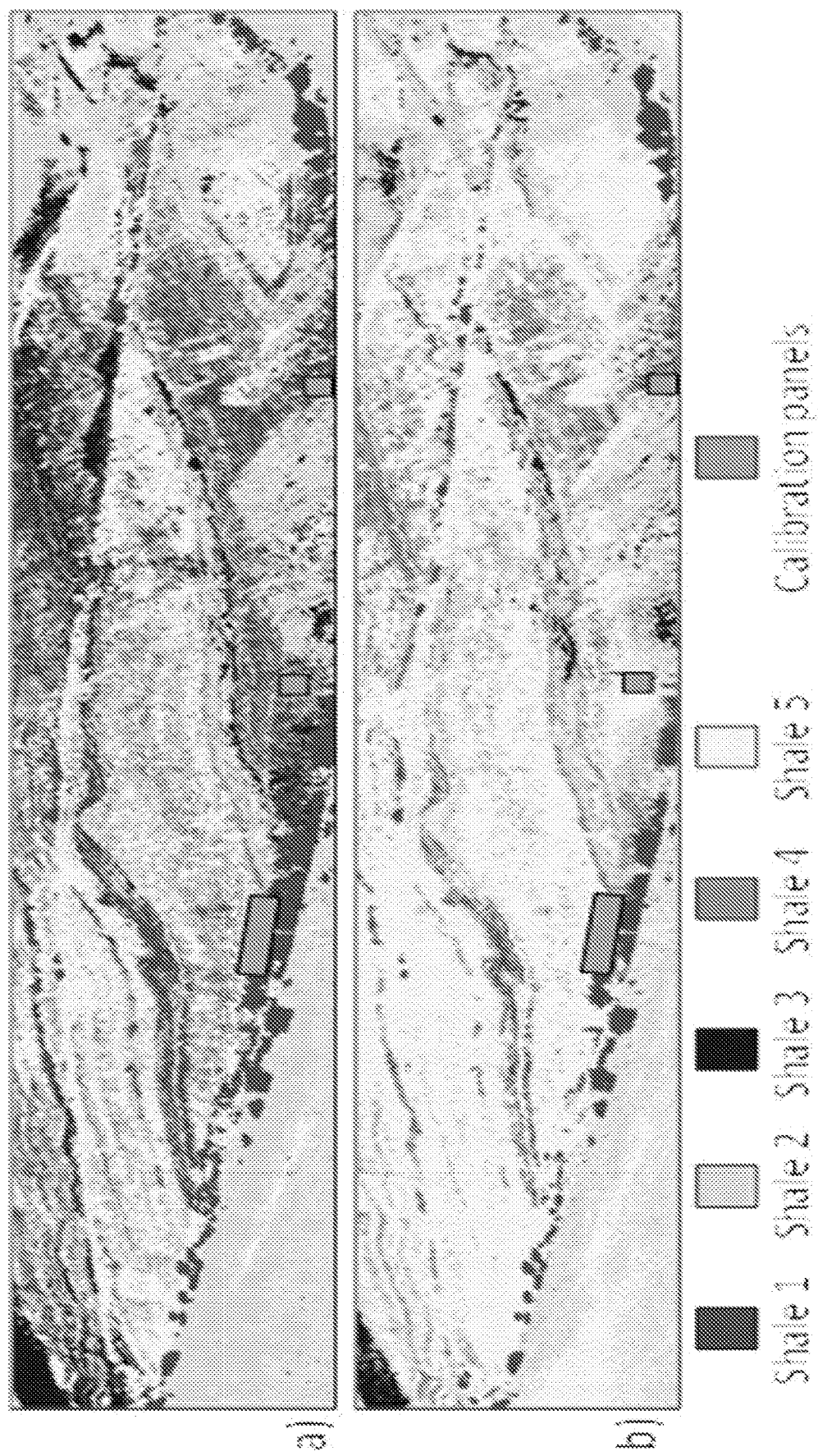
FIG. 34 illustrates example classified maps made from field hyperspectral imagery by (a) MTGP and (b) SAM. The major difference between the classified images is in the numbers of pixels classified as Shale 3 and Shale 1.

Experiment 2: The results of classifications made by MTGP and SAM showed similar spatial patterns in the distribution of shales on the rock wall are illustrated in FIG. 34. These were broadly comparable with the general distributions mapped in the field. Two major differences in classification were evident between the classifications made by MTGP and SAM: 1) a larger numbers of pixels were classified as Shale 3 by MTGP than by SAM. These pixels were distributed in spatially-contiguous blocks or layers in the image and were classified as Shale 2 by SAM. The large numbers of pixels classified as Shale 3 by MTGP and as Shale 2 by SAM were investigated quantitatively by comparing the classified maps with the areas mapped in the field as Shale 2 and Shale 3. This was done in the same way as for the laboratory imagery. It was possible to apply a quantitative approach because Shale 2 and Shale 3 could easily be identified in the field as discrete, internally homogenous, areas on the rock wall. This was not the case for the other shales due to large amounts of variability at the small spatial scale. The high spatial resolution of the sensor captured this variability making it difficult to assign discrete areas of the rock face to a definitive class; and 2) a larger numbers of pixels were classified as Shale 1 by MTGP than by SAM which, most commonly, classified these pixels as Shale 5. Many of these pixels were either individual pixels or distributed as small groups of pixels scattered about the mine face. These differenced in classifications were investigated by examining the spectra of pixels that were classified as Shale 1 (by MTGP) and Shale 5 (by SAM). Ten pixels were randomly extracted from the imagery and plotted together with the library spectra for Shale 1 and Shale 5 that were used in the classification by SAM. Classifications of these spectra made by a human spectroscopist were compared with those made by MTGP and SAM.

Differences in MTGP and SAM classifications of Shale 2 and Shale 3

MTGP outperformed SAM in the classification of Shale 2 and Shale 3 (Kappa coefficients of 0.78 and 0.25, respectively). Errors of commission and omission showed that SAM confused these 2 classes to the extent that over 56% of pixels that should have been classified as Shale 3 were erroneously classified as Shale 2 in the majority of cases. Table 6 illustrates the errors of commission and omission for class Shale 2 and class Shale 3 from the image of the rock face.

TABLE 6

| Class | MTGP | | SAM | |
| --- | --- | --- | --- | --- |
| | Commission | Omission | Commission | Omission |
| Shale 2 | 19.23 | 3.47 | 47.53 | 16.82 |
| Shale 3 | 2.86 | 16.32 | 22.21 | 56.12 |

Examination of the average spectrum for Shale 2 and Shale 3 (i.e. the spectra used in the SAM classification) showed that over the overall shape of the spectral curve were similar for these classes. Both spectra were convex in shape and had a sharp rise in reflectance from 1000 nm to a peak at ~1300 nm, indicative of ferric iron. Their spectral similarity is illustrated in Table 7, which shows the spectral similarity index between pairs of average spectra for each class in the spectral library: 0 is no similarity; 1=spectra are the same.

TABLE 7

| | Shale 1 | Shale 2 | Shale 3 | Shale 4 | Shale 5 |
| --- | --- | --- | --- | --- | --- |
| Shale 1 | 1 | | | | |
| Shale 2 | 0.84 | 1 | | | |
| Shale 3 | 0.66 | 0.82 | 1 | | |
| Shale 4 | 0.88 | 0.86 | 0.7 | 1 | |
| Shale 5 | 0.78 | 0.81 | 0.72 | 0.71 | 1 |

Thus, the similarity in the overall spectral shape could explain why the SAM classification was confusing these classes. This further raised questions as to the reasons why the MTGP outperformed SAM. To address this, 3 separate areas in the images were identified which were exclusively classified as Shale 2 by SAM and as Shale 3 by MTGP.

Figure 35:
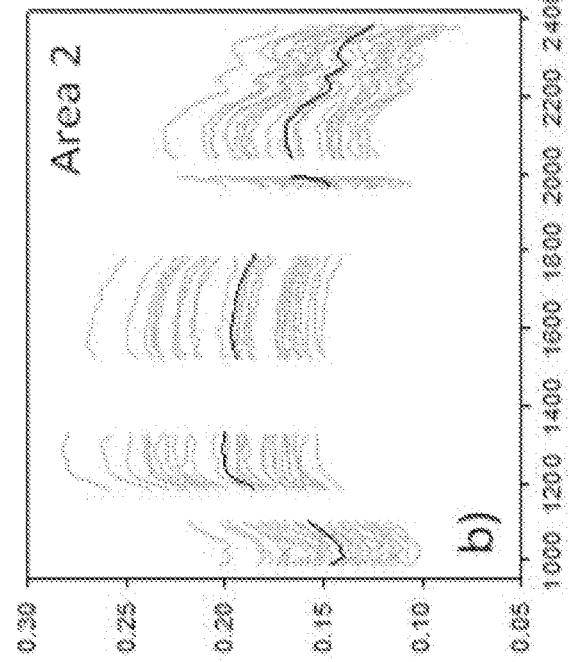
FIGS. 35 to 38 illustrate the variability of spectra of nontronite.
Figure 36:
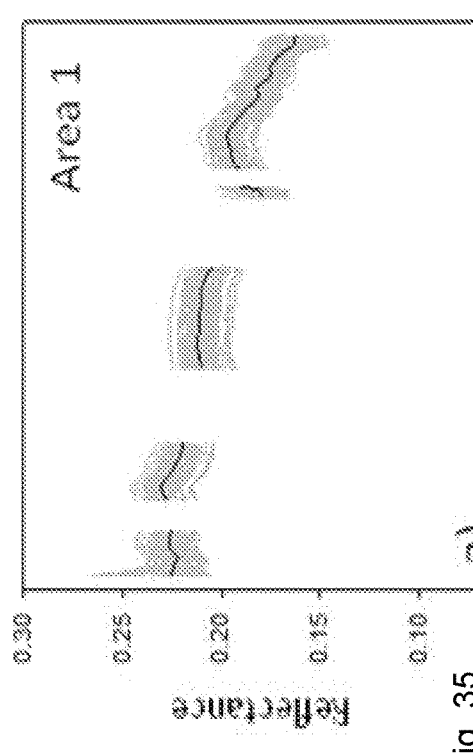
Figure 37:
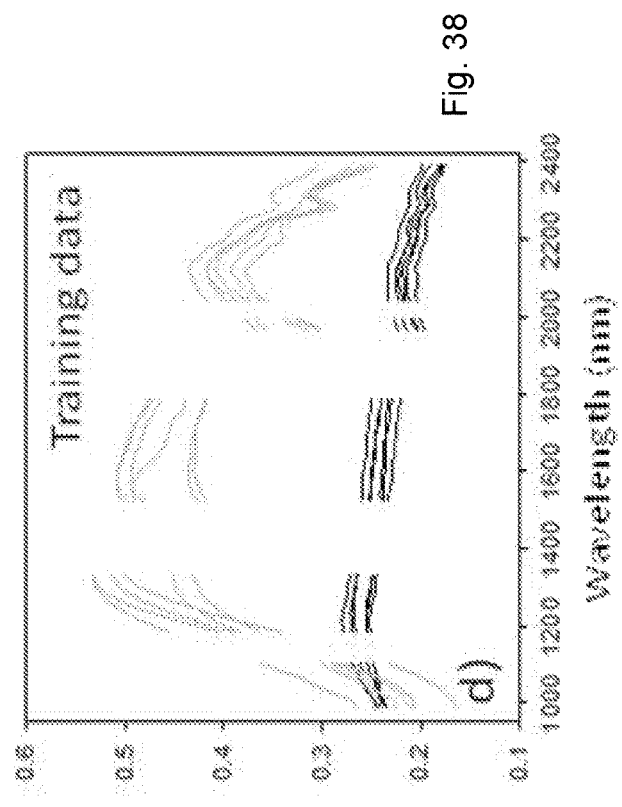
Figure 38:
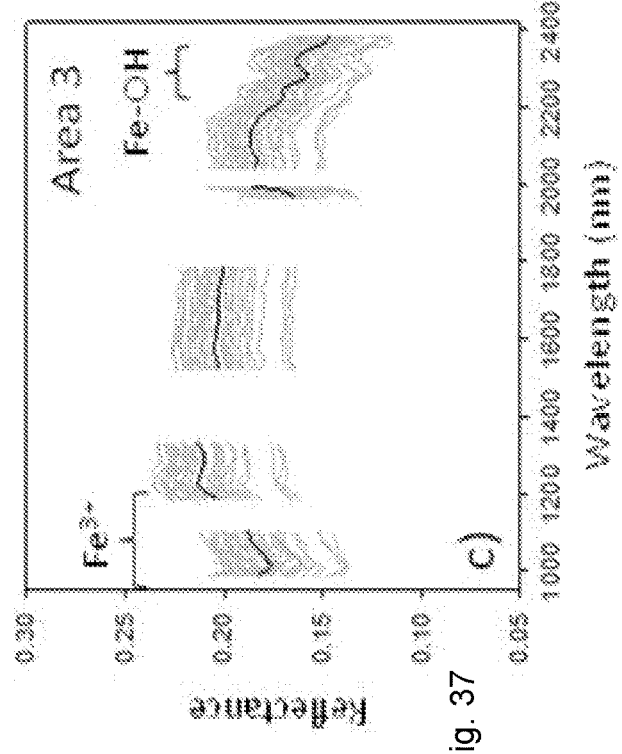

Spectra from these areas were extracted from the image. Spectra from the different areas all showed the diagnostic features associated with Fe—OH and are represented in FIG. 35 to FIG. 38. However, not all the spectra exhibited the rise in reflectance between 1000 nm and 1300 nm (cf. FIG. 35, area 1 and FIG. 36 area 2). Examination of a selection of the individual spectra used for training the MTGP showed that spectra had absorptions associated with Fe—OH but some had a much greater increase (slope) in reflectance between 1000 nm and 1300 nm than others (FIG. 38). This variability in spectra occurred within the same rocks classified as Shale 3 by visual inspection and XRD analysis. The average spectra used for the SAM classification (FIG. 36) had a large slope between 1000 nm and 1300 nm. Thus, the inherent variability in the nontronite spectra was captured by MTGP but not by SAM, leading to confusion between these classes in the SAM classification.

Differences in MTGP and SAM Classifications of Shale 1 and Shale 5

Figure 39:
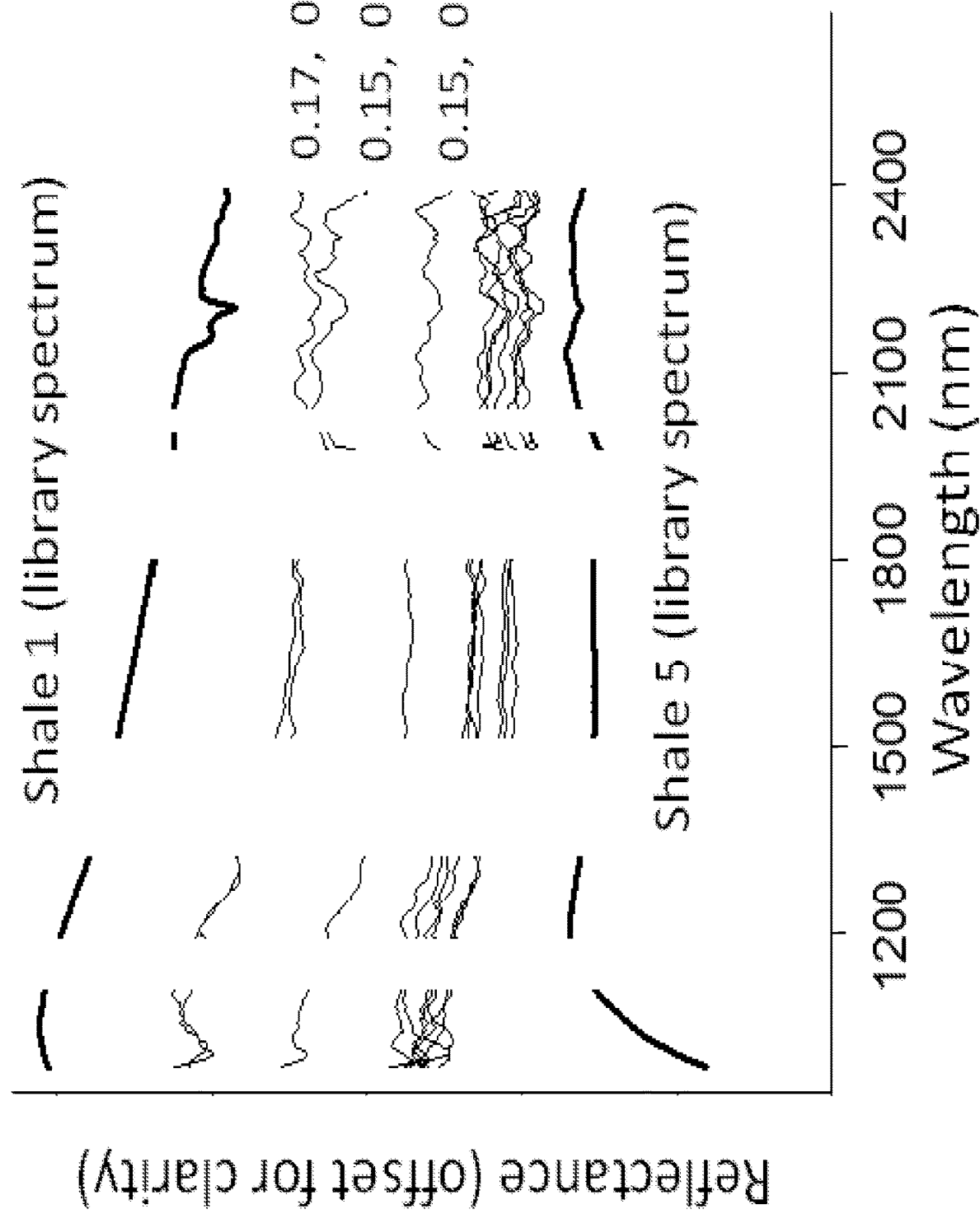
FIG. 39 illustrates image spectra classified as Shale 1 by MTGP but as Shale 5 by SAM. The library spectra of Shale 1 and Shale 5 are shown for comparison. In all cases, the spectral angle between each of the image spectra and the library spectrum for Shale 5 is smaller than for Shale 1. The spectral angle is shown for three image spectra as an example; the first and second numbers represent the spectral angle between that spectrum and the library spectrum for Shale 1 and Shale 5, respectively.
Figure 40:
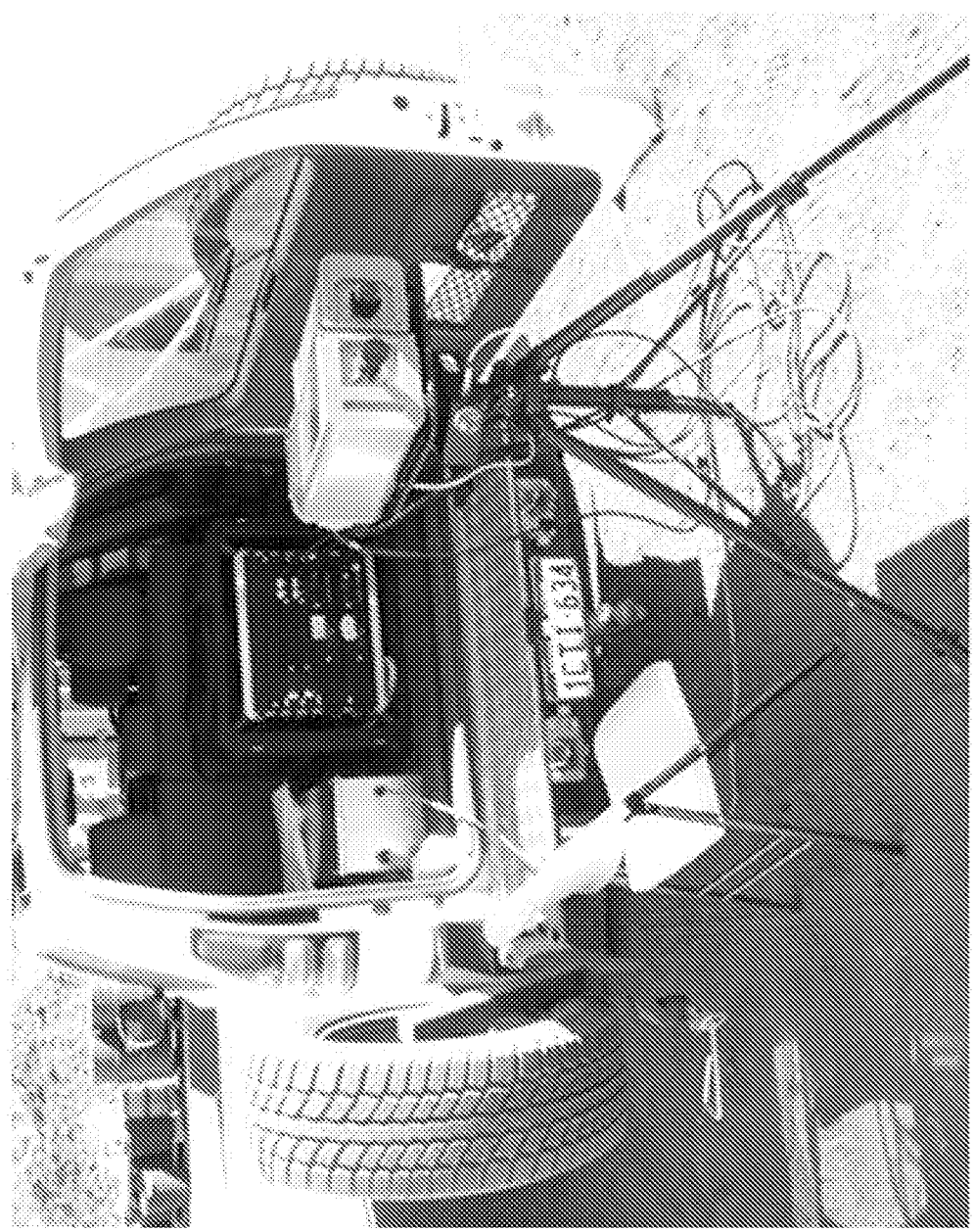
FIG. 40 illustrates one form of prior art use of hyperspectral imagers for capturing hyperspectral images in a mining environment.

Comparison of spectra randomly extracted from the imagery for pixels classified as Shale 1 and Shale 5 by MTGP and SAM, respectively, had a similar curve shape (FIG. 39). Spectra generally decreased with increasing wavelength and did not have a large slope between 1000 nm and 1300 nm, indicative of ferric iron absorption. Many spectra also had a discrete absorption feature at about 2200 nm of about the same strength (depth) as the library spectrum for Shale 1. These spectral characteristics are all consistent with the library spectrum for Shale 1. The most striking difference between the library spectrum for Shale 5 and the image spectra was that it had a steep slope between 1000 nm and 1300 nm. This was not present in any of the image spectra. Despite these similarities between the library spectrum for Shale 1, the image spectra were classified by SAM as Shale 5 (see smaller spectral angle for Shale 5 than Shale 1; FIG. 39). Thus, the classification made by MTGP was more consistent with the results from interactive spectroscopic examination.

The ability to classify hyperspectral imagery acquired in natural sunlight using libraries of known minerals acquired under artificial light is challenging. Image spectra acquired in the field or from aircraft have potentially different characteristics to library spectra acquired in the laboratory by non-imaging or imaging hyperspectral sensors. Spectra acquired under natural light incorporate effects from the intervening atmosphere, increasing noise in some parts of the spectrum whilst preventing entirely other parts being used.

It is this variability in atmospheric effects that directs the importance to the use of library spectra acquired under standard 'optimal' conditions (i.e. using artificial light) for classification. There are several reasons why pixel spectra from imagery acquired under natural light may differ from spectra of rocks or minerals acquired under artificial light. These reasons may be related to the physical-chemical aspects of mineralogy e.g. variability in mineral abundance, crystallinity or grain size. Such effects can cause changes to the shape of the spectral curve, or the wavelength position or depth of individual absorption features. Often major differences occur because of extraneous factors that are unrelated to mineralogy. These include atmospheric effects caused by absorption and scattering of light by atmospheric gases and aerosols. Effects related to the topography of the target being measured, e.g. variations in incident and reflected light can also have a profound effect on the magnitude (brightness) of spectra. To address these differences, methods used to classify hyperspectral data must have two properties. First, library spectra must encompass the natural variability observed within rock or mineral classes. To do this, multiple spectra should be used in the classification process to capture the natural within-class variability arising from variations in physical-chemical properties of that class. Second, methods must be able to deal with variability in the magnitude of spectra arising from variations in topography or albedo among the spectra being classified.

Both these requirements are met by the MTGP methodology of the preferred embodiments because they use multiple spectra for training (thus incorporating spectral variability) and use a non-stationary covariance function, which ignores differences in spectral magnitude. Furthermore, MTGP performs the classification within a single unified step, thus removing the need to repeat the classification process for each class being considered. A multi-task covariance function is derived enabling such multi-class MTGP classification.

Using conventional statistical measures, the performance of MTGP was superior to that of the conventional implementation of SAM. This was the case for imagery acquired in the laboratory and in the field. The major difference between the MTGP and SAM classifications of the example field imagery of the rock wall was that Shale 3 was underrepresented in the SAM classification. SAM consistently confused Shale 3 with Shale 2. The reason for this confusion was that the average spectra for Shale 2 and Shale 3, used in the SAM classification, were similar. However, the individual spectra that made up the average spectra for Shale 3 and that were used in the training of the MTGP showed large amounts of variability. This variability was not contained within the single average spectrum and was therefore unrecognised by SAM. MTGP was able to correctly map the locations of Shale 3 because similar attributes of variability (i.e. spectral differences in the intensity of absorption by ferric iron) were observed both in the individual training spectra and on the rock wall.

The complex nature of the physical processes involving absorption means that different parts of the spectral curve are optimally discriminative for different minerals. In the present analysis the whole SWIR spectral curve was used to do the classification. In alternative embodiments certain parts of the spectral curve could be denoted to have greater importance than others during training and classification. Depending on the composition of the rocks or minerals being mapped, the selection of specific wavelength regions for classification can have a significant impact upon the resulting classified map.

In the present implementation of MTGP, all wavelengths in the data are given equal weight. This means that the overall shape of the spectral curve is used. Yet, for many minerals, which have diagnostic absorption features, this strategy may not be optimal. Many features that are diagnostic of certain minerals occur between 2000 and 2450 nm and are relatively narrow. The presence of such features is a powerful aid to classification because they unambiguously identify the presence of a particular mineral. These narrow but important features represent a relatively small proportion of the overall amount of data that are available in the whole spectral curve. Because they are given equal weighting to all other bands their relative importance is not considered by the MTGP. This can have a significant impact upon classification results.

The preferred embodiments therefore provide a multi-task classifier, based on Gaussian processes—the MTGP—for the classification of hyperspectral data. MTGP operates within a multi-task framework, thus classification is done in a single unified process, which removes the need for running the classifier multiple times. The new multi-task covariance function has been developed to enable a multi-class MTGP classification. The MTGP was applied to hyperspectral imagery acquired in the laboratory from rock samples and from a vertical rock wall in an open pit mine. Results from MTGP were superior to those obtained from the classical implementation of SAM.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognise that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A hyperspectral imager for imaging external environments, the imager including:
    an optical line scanner unit adapted to perform line scans of a mining environment via rotation thereof;
    an environmental enclosure attached to and surrounding the optical line scanner unit providing a first degree of temperature and dust isolation from the environment, the enclosure mounted on a rotatable platform;
    the rotatable platform being attached to the environmental enclosure, adapted to simultaneously rotate the environmental enclosure unit and optical line scanner unit under the control of an electronic control system; and
    the electronic control system controlling the optical line scanner unit and the rotatable platform for the capture of hyperspectral images by said imager.

2. A hyperspectral imager as claimed in claim 1 further including a desiccant port and holding bay for holding a desiccant for providing humidity control to said enclosure.

3. A hyperspectral imager as claimed in claim 1 wherein:
    said rotatable platform is driven by a cable chain to manage cable movement and prevent breakage; and
    said environmental enclosure includes at least one optical aperture for projection of an optical lens of the optical line scanner unit.

4. A hyperspectral imager as claimed in claim 1 further including an image processing unit interconnected to the optical line scanner unit, adapted to receive and store the line scans of the optical line scanner unit as corresponding hyperspectral images and to process the luminance content of the captured line scans, including:
    determining a comparison between a reference spectrum and a captured spectrum; and where the captured spectrum exceeds the reference spectrum by a first predetermined amount, reducing the exposure of the captured spectrum by a second predetermined amount.

5. A hyperspectral imager as claimed in claim 1 further including an image processing unit interconnected to the optical line scanner unit, adapted to receive and store the line scans of the optical line scanner unit as corresponding captured hyperspectral images and to process the luminance content of the captured line scans, including:
    determining a first level of brightness of a frame of the captured image;
    comparing the first level of brightness to a predetermined desired level of brightness;
    determining a logarithm difference measure between the first level of brightness and the desired level of brightness; and
    adjusting the exposure level of the image in accordance with the logarithm difference measure.

6. A hyperspectral imager as claimed in claim 5 wherein only predetermined wavelength bands of the hyperspectral image are utilised in calculation of the first level of brightness.

7. A hyperspectral imager as claimed in claim 5 wherein iteratively adjusting the exposure level of the captured hyperspectral image initially starts with a low exposure level.

8. A hyperspectral imager as claimed in claim 1 further including an image processing unit interconnected to the optical line scanner unit, adapted to receive and store the line scans of the optical line scanner unit as corresponding captured hyperspectral images and to process the series of hyperspectral images in order to classify its constituent parts, wherein the processing includes:

deriving a non-stationary observation angle dependent probabilistic model having a series of parameters for the series of hyperspectral images;

training the series of probabilistic model parameters on mineral samples obtained from artificial light reflectance measurements; and utilising the probabilistic model on hyperspectral imagery acquired from sampling geographical conditions under natural lighting conditions, to classify constituent parts of the hyperspectral imagery.

9. A hyperspectral imager as claimed in claim 8 wherein said probabilistic model comprises a non-stationary covariance function.

10. A hyperspectral imager as claimed in claim 9 wherein said probabilistic model comprises a non-stationary observation angle dependent covariance function (OADCF).

11. A hyperspectral imager as claimed in claim 8 wherein said probabilistic model includes a multi task Gaussian process, and said training step includes training the images on reflectance spectra obtained utilising artificial lighting.

12. A hyperspectral imager as claimed in claim 8 wherein said probabilistic model includes a multi task Gaussian process utilising a non-stationary covariance function that is lumination invariant.

13. A hyperspectral imager as claimed in claim 8 wherein said probabilistic model is a multi-task covariance function.

14. A hyperspectral imager as claimed in claim 8 wherein said probabilistic model is derived from a portion of said hyperspectral imagery that include low levels of atmospheric absorption.

15. A hyperspectral imager as claimed in claim 1 further including an image processing unit interconnected to the optical line scanner unit, adapted to receive and store the line scans of the optical line scanner unit as corresponding captured hyperspectral images and to process the hyperspectral images captured under natural lighting conditions, including:

capturing a hyperspectral image of an external environment in natural illumination conditions;

capturing overlapping range distance data of the surfaces in the external environment;

utilising the overlapping range data to decompose the external environment into a series of patches (or a mesh);

performing an inverse rendering of light absorption on each patch to determine level of reflectance of the patch, by at least one of: a sun light source, ambient sky illumination and surrounding patches; and utilising the level of reflectance of each patch to alter the level of corresponding pixels within the hyperspectral image.

16. A hyperspectral imager as claimed in claim 15 wherein said inverse rendering comprises an inverse radiosity rendering and said patches are tessellated.

17. A hyperspectral imager as claimed in claim 15 further including: adaptive subdivision of the range data into a series of patches; and performing a form factor estimation for said series of patches.

18. A hyperspectral imager as claimed in claim 15 wherein the processing is repeated for each wavelength of the captured hyperspectral image.

19. A hyperspectral imager as claimed in claim 15 further including determining a level of reflectance of each of a sun light source, ambient sky illumination and surrounding patches.

20. A hyperspectral imager as claimed in claim 1 wherein the imager is adapted to be mounted on a vehicle.

21. A hyperspectral imager for imaging external environments, the imager including:

an optical line scanner unit adapted to perform line scans of a mining environment via rotation thereof;

an environmental enclosure surrounding the optical line scanner unit providing a first degree of temperature and dust isolation from the environment, the enclosure mounted on a rotatable platform;

the rotatable platform being attached to the environmental enclosure, adapted to rotate the environmental enclosure unit and optical line scanner unit under the control of an electronic control system;

the electronic control system controlling the optical line scanner unit and the rotatable platform for the capture of hyperspectral images by said imager; and an image processing unit interconnected to the optical line scanner unit, adapted to receive and store the line scans of the optical line scanner unit as corresponding hyperspectral images and to process the luminance content of the captured line scans, including:

capturing a hyperspectral image of an external environment utilising a current exposure level;

determining a saturation proportion being the ratio of the number of spectral channels at an upper saturation limit to the total number of spectral channels; and if the saturation proportion is above a predetermined threshold, reducing the current exposure level of the captured hyperspectral image.

22. A hyperspectral imager as claimed in claim 1, further including a thermo-electric cooler unit attached to the environmental enclosure for cooling the enclosure, thereby maintaining the enclosure at a stable temperature during operations;

wherein the electronic control system controls the thermo-electric cooler unit.

23. A hyperspectral imager as claimed in claim 22 wherein said thermo-electric cooler unit is mounted on top of the enclosure.

24. A hyperspectral imager as claimed in claim 21, further including a thermo-electric cooler unit attached to the environmental enclosure for cooling the enclosure, thereby maintaining the enclosure at a stable temperature during operations;

wherein the electronic control system controls the thermo-electric cooler unit.

25. A hyperspectral imager as claimed in claim 24 wherein said thermo-electric cooler unit is mounted on top of the enclosure.

* * * * *